(12) United States Patent
Cunningham et al.

(10) Patent No.: US 12,518,539 B2
(45) Date of Patent: *Jan. 6, 2026

(54) REMOTE MONITORING METHOD USING IMAGE PROCESSING INTELLIGENCE

(71) Applicant: WAVE9 TECHNOLOGY INC., Spruce Grove (CA)

(72) Inventors: Ian Cunningham, Regina (CA); Barrett Ramstead, Regina (CA); Ricardo Mendizabal, Regina (CA); Minhajul Arifin Badhon, Saskatoon (CA)

(73) Assignee: WAVE9 TECHNOLOGY INC., Spruce Grove (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/889,167

(22) Filed: Sep. 18, 2024

(65) Prior Publication Data

US 2025/0014348 A1 Jan. 9, 2025

Related U.S. Application Data

(63) Continuation-in-part of application No. 17/765,803, filed as application No. PCT/CA2020/051335 on Oct. 5, 2020, now Pat. No. 12,101,552.

(30) Foreign Application Priority Data

Oct. 4, 2019 (CA) .................................. CA 3057655

(51) Int. Cl.
*G06V 20/52* (2022.01)
*G06V 10/22* (2022.01)
(Continued)

(52) U.S. Cl.
CPC ............ *G06V 20/52* (2022.01); *G06V 10/225* (2022.01); *G06V 10/25* (2022.01); *G06V 10/945* (2022.01);
(Continued)

(58) Field of Classification Search
None
See application file for complete search history.

(56) References Cited

U.S. PATENT DOCUMENTS 5,757,287 A 5/1998 Kitamura et al.
9,770,382 B1 * 9/2017 Ellis .................. G01S 13/93
(Continued)

OTHER PUBLICATIONS

International Search Report mailed Jan. 12, 2021 for PCT/CA2020/051335.

*Primary Examiner* — Daniel T Tekle
(74) *Attorney, Agent, or Firm* — Suiter Swantz IP

(57) ABSTRACT

A method and system for remote visual inspection and failure detection at industrial sites, utilizing pre-existing digital cameras connected to a server. The server hosts adaptive object-detection software that analyzes images from the cameras to identify focus cues, which indicate areas prone to failure. The system contextualizes these images to define interest regions that require ongoing monitoring. In a continuous monitoring loop, new images are periodically received, processed, and analyzed for visible failure attributes. Detected potential failures trigger notifications to users via a human interface, allowing them to validate or modify the system's findings. User feedback is used to enhance the software's accuracy over time. The system supports various camera types and is adaptable to multiple monitoring environments, offering a robust solution for automating failure detection without requiring specialized site hardware.

12 Claims, 12 Drawing Sheets

(51) Int. Cl.
*G06V 10/25* (2022.01)
*G06V 10/94* (2022.01)
*G06V 20/40* (2022.01)
*H04N 7/18* (2006.01)

(52) U.S. Cl.
CPC .............. *G06V 10/95* (2022.01); *G06V 20/46* (2022.01); *H04N 7/181* (2013.01)

(56) References Cited

U.S. PATENT DOCUMENTS

| | | |
|---|---|---|
| 2002/0019725 A1 | 2/2002 | Petite |
| 2002/0033759 A1 | 3/2002 | Morello |
| 2010/0156632 A1* | 6/2010 | Hyland .................. G01N 21/94 |
| | | 702/188 |
| 2011/0308638 A1 | 12/2011 | Hyland et al. |
| 2014/0002639 A1 | 1/2014 | Cheben et al. |
| 2014/0184803 A1* | 7/2014 | Chu ........................ G06T 7/292 |
| | | 348/159 |
| 2015/0316262 A1* | 11/2015 | Immer .................... F23N 5/242 |
| | | 431/2 |
| 2018/0357916 A1* | 12/2018 | Breed ................... G06V 40/19 |
| 2025/0014348 A1* | 1/2025 | Cunningham ......... G06V 20/52 |

* cited by examiner

REMOTE MONITORING METHOD USING IMAGE PROCESSING INTELLIGENCE

CROSS-REFERENCE TO RELATED APPLICATIONS

This continuation-in-part application claims the benefit of priority of U.S. application Ser. No. 17/765,803 filed Mar. 31, 2022, which is a 371 of international PCT/CA2020/051335 filed Oct. 5, 2020, which claims the benefit of priority of CA 3057655 filed Oct. 4, 2019, which are hereby incorporated by reference in their entirety.

FIELD OF THE INVENTION

This invention is in the field of remote monitoring of oilfield facilities such as artificial lift systems, pipelines, tanks and the like and more specifically is in the area of systems and methods for non-human remote detection and monitoring of piping and storage installations and the like to detect anomalies requiring human intervention or attention and dispatching of same.

BACKGROUND OF THE INVENTION

Oil and gas processing and extraction facilities and other similar petrochemical and industrial sites use human operators to visually inspect facilities for the presence of contamination in various forms such as fluid, film or vapour which might result from the collection and transport of oil emulsion, oil products or other byproducts. The presence of such contamination is used as an indicator of a potential equipment failure which might require further follow-up, repair etc.

In a most traditional context, inspection and monitoring for contamination and remediation requirements such as these was done manually, by having human operators conduct in-person inspection of facilities on a periodic basis. This is time intensive and costly.

For many companies, safety is identified as the need of highest importance—avoiding unnecessary human interaction or attendance for inspection or repair at various sites, to minimize the likelihood of human injury. Environmental risk reduction and productivity were also identified in a market scan as target areas.

In some instances, producers and operators have used cameras in combination with human review to remotely assess production and processing sites for evidence of such contamination. This has typically been done by the installation of remote cameras which send photos from installations to be inspected wirelessly to a central location where they are visually inspected by an operator. Human inspection even using photos rather than site review requires similar high attention to detail and continual review. Human monitoring of a datastream or data repository with few anomalies has never been an effective process, since the meticulousness of the inspection required is counter to the volume of the data and makes it difficult and prone to human error. One of the benefits of the use of cameras however rather than human inspection at sites is the fact that it lowers the number of in person visits required, enhancing safety and reducing cost. If it were possible to come up with a method of remote site monitoring to monitor piping and similar production installations such as these for contamination or indication of failure that reduced the likelihood of human error, this would be highly commercially attractive. Visual inspection is key to the detection of leaks or failures and so any type of remote monitoring solution which could come up with an enhanced visual detection approach which limited the potential for human error would, it is believed, be most highly desired in the industry.

The industry has used many different types of systems in the past but there are specific requirements not being met by existing technology options. In certain prior art tools, other market entrants have rendered products which draw upon photo and sensor data but they simply display the raw data for a remote operator to visibly analyze. This maintains the need for operations staff to perform inspection and interpret data.

Added data is also available in many remote monitoring applications including in those related to piping and similar installations—pressure readings, equipment power consumption, and many numbers of different types of data can be captured and are captured in current remote monitoring applications. Reviewing the captured remote data in addition to captured remote images even further increases the likelihood of human error in a remote human inspection environment, since even further volumes of data require attention by human operators. If it were possible to come up with a method of remote monitoring that incorporated visual review of equipment and locations for evidence of contamination, failure or potential failure the monitoring of sensor data from the sites, if human error could be minimized, accuracy of detection could be maximized.

Developments in remote monitoring methodologies and sophisticated data monitoring approaches have been used successfully in many other industries and, both from a cost and efficiency perspective as well as from the perspective enhanced accuracy, it is believed that responsible entities in the petrochemical and related production industries operating facilities of this type would benefit from and show significant commercial adoption of a software solution that assists in a remote monitoring application and minimizes the need for human inspection. If it were possible to conduct a higher frequency of inspections, oil leaks and the like could be more quickly addressed than current workflows allow. Asset failures and asset health could be monitored and addressed quickly, which would improve financial decision-making and production efficiency. Electronic monitoring and intelligent data analysis are believed to be able to provide significant operational improvements, given the current asset management maturity levels of many hydrocarbon producers.

SUMMARY OF THE INVENTION

The present invention is a method and system, along with related components, for remote visual inspection and failure detection at a plurality of monitoring locations. Each of the monitoring locations, whether they be long-range remote from the server and the central operations of the system, or situated in an on-site large industrial installation environment, would have at least one interest region that is primarily desired to monitor on an ongoing basis. The interest regions are areas of particular concern from the perspective of visual inspection, which are subject to failure or stress and are traditionally inspected most carefully by on-site personnel. These regions within a particular view of the installation at a monitoring location are critical areas requiring frequent and precise visual inspection-such as pipe joints, valves, tank ports, and similar components. Any number of different types of interest regions are contemplated within the context of inspection of installations of this nature, and any type of an interest region which would be understood and defined in a traditional visual inspection method will be understood to be within the scope of the present invention.

The method will be practiced by utilizing digital cameras and site hardware at each monitoring location (likely third party or pre-existing), which are connected to a network capable of transmitting image data corresponding to images captured by the at least one digital camera associated therewith to a remote server. The system is designed to work with existing hardware interfaces at the monitoring location, which facilitates the capture and transmission of the necessary visual views of the monitoring location and the interest regions. These pre-existing hardware interfaces would be connected to a server via their respective network interfaces, allowing for the monitoring and detection process to be carried out in accordance with the method of the present invention. The method accommodates any configuration of cameras and network-connected devices already present at the monitoring locations, enabling users to leverage existing infrastructure without the need for additional proprietary hardware. In certain cases where it was desired to use purpose built hardware and cameras, that can also be accomplished by providing a hardware interface device capable of connection to the cameras at the monitoring locations which can turn connected via the network to the server and execute the remainder of the method In certain cases, multiple cameras may be utilized at a monitoring location, each capturing views of different areas where the location is larger or more complex. In smaller installations, a single camera might be sufficient; however, the method also supports the use of multiple cameras, even in smaller settings, to provide multiple angled views of the same area. This enhances the accuracy and reliability of the software and server in predicting anomalies in accordance with the method. Any number of cameras present in a monitoring location, connected to existing hardware, will be understood to be within the scope of the present invention.

In some embodiments of the method, multiple hardware devices or pre-existing systems might also be employed at a single monitoring location where a large number of cameras are present, requiring substantial processing bandwidth, or in a large, spread-out installation where it is more practical to use multiple hardware devices spaced across physical distances. Again, the number and configuration of these devices at a particular monitoring location will be understood to vary without departing from the scope of the present invention.

The system utilizes network-connected endpoint camera hardware, which includes software components capable of facilitating the capture of images from at least one camera, converting these images to image data, and transmitting this data to a remote server. The method adapts to the configuration of the pre-existing network and hardware infrastructure at each monitoring location, allowing the server to receive and process image data transmissions.

The server comprises a processor and memory, consistent with standard computing devices, along with at least one server network interface capable of receiving image data transmissions from the pre-existing hardware at the monitoring locations. The server is also equipped with at least one human interface device, which allows the server to display information graphically to users and to enable user interaction and data selection during the administration of the method.

The server further includes a monitoring software component that comprises the necessary processor instructions to facilitate the conduct of the method by the server. Specifically, the monitoring software component includes an adaptive object-detection function capable of analyzing image data and identifying various objects therein. The strength and functionality of this adaptive object-detection function is central to the novelty of the present invention—not only does the function identify focus areas and failure attributes of concern in captured or extracted images, but it is also capable of adapting and improving its accuracy over time. This adaptation occurs each time data is captured from the correct or incorrect execution of a monitoring loop or contextualization step as part of the method. The software detects focus cues, which indicate interest regions in images of monitoring locations that correspond to high-probability failure areas for ongoing visual inspection. The second primary function of the image detection capability is the identification of visible failure attributes indicating the potential existence of failure conditions at a monitoring location.

A contextualization step will be executed with respect to each monitoring location at least once, to contextualize each camera view. Contextualizing the monitoring location in respect of each camera view involves effectively identifying the interest regions within a particular image that require visual monitoring for evidence of failure conditions. The camera view is contextualized by selecting an extracted image of the camera view, recovered from the conduct of an extraction step, and applying the adaptive object-detection function to detect the presence of any focus cues within the extracted image, signifying interest regions.

Using each identified focus cue, the software calculates the desired dimensions and location of an interest region within the extracted image, encompassing the signified interest region to be monitored. The dimensions and location of each determined interest region are then stored in respect of the corresponding camera view, which is now a contextualized camera view. These focus cues highlight high-probability failure areas within each corresponding image—for example, by detecting the presence of a valve or a particular type of pipe connection that is known to be prone to failure or require monitoring. This process enables the server to continue monitoring according to the invention.

It is typically necessary to contextualize each monitoring location and define the location of the interest regions in respect of each camera view only once, unless the cameras are moved. It is assumed that most embodiments of the method would rely on fixed-position cameras, where the view remains unchanged; however, it is understood that the system and method of the present invention and the monitoring software component can be adapted for wider-angle or moving camera views. Any modifications to the periodic frequency of image data transmission processing for the purpose of contextualizing the monitoring location will be understood to be within the scope of the present invention.

Following the contextualization of each camera view with respect to a monitoring location, a monitoring loop is conducted using the server and the monitoring software component to detect the presence of failure conditions requiring human inspection at the particular monitoring location. This is achieved by, upon the completion of an extraction step in respect of a received image data transmission at the server pertaining to a contextualized camera view, first selecting the extracted image captured in respect of the contextualized camera view for analysis. The stored dimensions and location of each interest region for the contextualized camera view are then retrieved from the memory of the server.

In executing the method of the present invention, image capture steps are periodically performed at each monitoring location using the pre-existing hardware. The execution of an image capture step involves, using the software and the existing hardware components, capturing an image from at least one digital camera connected to the site's infrastructure. The image data corresponding to each captured image is then consolidated into a data packet for transmission to the server. Upon generating a data packet corresponding to an image data transmission, it is sent to the server via the network.

Upon receipt of a packet corresponding to an image data transmission at the server from a monitoring location, the server and the monitoring software component conduct an extraction step, parsing the image data transmission into at least one extracted image of a camera view from the corresponding monitoring location.

The monitoring software component applies the adaptive object-detection function to at least the portions of the extracted image corresponding to the stored dimensions and location of each interest region for the camera view, to detect the presence of any failure attributes therein that indicate the existence of a failure condition.

If any failure conditions are detected, a notification step is executed in respect of the interest region by generating a graphic display via a human interface device in communication with the server. This display shows at least the portion of the extracted image corresponding to the interest region containing the detected failure condition. The user is permitted to validate or reject the detected failure conditions via the human interface device, and any user validation or rejection interactions with the server are saved. Essentially, the user can, upon notification of an alert, conduct a human review of the imagery associated with an automated determination of a failure condition and either accept or reject the detected conditions and attributes. This may result in ordering a physical inspection or clearing the exception generated by the system, allowing monitoring to continue.

In certain embodiments of the notification element of the method of the present invention, the display to the user via the human interface device could also include markings showing the specific identified failure attributes located by the monitoring software component within the image, along with a calculated certainty score for the detected failure conditions.

Following the completion of the notification step, the monitoring software component adapts the function based on stored user interactions, such as validation, rejection, or modification of detected failure conditions, to enhance the accuracy and certainty of the function in future detections. Failure by the user to intervene or interact with the server following a notification may also be considered as ratification of the recognition or detection, strengthening the data model accordingly.

By providing alert displays to a human interface device, the server facilitates supplemental human review of detected potential failure conditions or anomalies at a particular monitoring location. By conducting much of the initial processing automatically, the system significantly reduces the amount of preliminary human data review necessary to reliably determine the existence of a failure condition.

When the method is practiced including a contextualization step in respect of each image data transmission received, the storage of the location and dimensions of the interest regions, having already been conducted in respect of the same transmission packet, might be stored in the volatile memory of the server. In other embodiments, where the images were not contextualized on the receipt of each image data packet and the location and dimensions of the interest regions were stored on a longer-term basis in the fixed memory of the server, that information can be retrieved as needed. Both approaches are contemplated within the scope of the present invention.

An image data transmission from pre-existing site hardware to the server may contain a single image captured from a single camera or multiple images captured from multiple cameras. Where a single image data transmission contains more than one captured image, the software and function can process the images serially or in parallel. Both approaches, and any necessary or attendant modifications to the workflow and software, will be understood to be within the scope of the present invention.

The adaptive object-detection function of the present invention is capable of identifying amorphous shapes, textures, colors, or the like, which might signify spills or other breaches or failure conditions that have not been effectively detected to date. If any type of a failure condition is detected within a particular interest region, an inspection condition exists.

As outlined above, the server is connected to at least one human interface device, which can display alerts and other information to users, along with allowing user interactions to validate, reject, or modify recognition and decisions made by the monitoring software component. In basic embodiments, the human interface device could be a display and an input device such as a keyboard or similar device attached directly to the server, capable of displaying information to a user and facilitating validation or rejection interactions.

In other embodiments, multiple human interface devices may be connected to the server, each corresponding to at least one monitoring location. These human interface devices could include the human interface of remote client devices, operatively connected to the server by the network. These devices could comprise client software or browser interfaces on portable smart devices, computers at remote office locations, or any type of electronic device capable of facilitating the human interactions outlined in the method of the present invention.

The first recognition step undertaken by the monitoring software component with the adaptive object-detection function is the contextualization of a monitoring location, wherein at least one image of a camera view captured at the monitoring location is processed for the purpose of recognizing focus cues within the image. Focus cues are items or characteristics recognizable by the function, which can identify high-probability failure areas in the overall camera view corresponding to the image. These focus cues could include detected corners, valves, or joints in piping installations, detected equipment components prone to failure, or even physical framing elements placed within the installation at the monitoring location, such as colored frames or markings, which define areas where interest regions are established. Any type of detectable focus cue that identifies interest regions requiring focused visual inspection will be understood to be within the scope of the present invention.

The contextualization step in respect of a particular monitoring location and camera view involves the automated recognition of interest regions by the monitoring software component and the adaptive object-detection function. In other embodiments, the contextualization step may also include displaying the extracted image to a user via a human interface device, along with an overlay of the location and dimensions of each determined interest region and an indicator of the detected focus cues associated with them. Essentially, a user can be shown the image with the computed shapes of the interest regions imposed on it, and the user can validate or reject the detected focus cues or modify the dimensions and locations of the interest regions determined by the function.

If a user validates or rejects any of the projected focus cues or validates, rejects, or modifies the dimensions and locations of the interest regions during the contextualization step, the monitoring software component will adapt the object-detection function to enhance its accuracy and certainty in future contextualization and interest region rendering based on user interactions. Various embodiments of a user interface permitting this type of viewing and data interaction are understood to be within the scope of the present invention.

The contextualization step could be conducted once, particularly where the cameras are fixed, or periodically based on image data transmission frequency, time, camera movement, or other triggers. In further embodiments, the contextualization step could be undertaken for each image data transmission received, as the first step in identifying the presence of any failure conditions in the images captured in that transmission.

Various failure attributes within an interest region used to determine the existence of a failure condition include color contrast, colors, textures, relative position of detected edges, relative orientation and angle of edges or contrasting regions, or identification of data patterns correlating to failure conditions. Any number of different failure attributes will be understood to be within the scope of the present invention.

In further embodiments of the method, pre-existing hardware might include sensors or other environmental monitoring equipment connected to the site's network. These sensors provide operating parameters or environmental data that enhance the accuracy of failure detection. The image data transmissions to the server from the existing hardware could include these parameter values, which the adaptive object-detection function can use to improve the detection of failure conditions. The function could also adapt based on the sensor data to enhance future object-detection accuracy.

Images captured from the digital cameras could be still images, ideal for remote monitoring applications with limited data bandwidth, or video images for environments with greater bandwidth availability. The necessary modifications to accommodate either still or video images are within the scope of the present invention.

The present invention also comprises a system for remote visual facilities inspection and failure detection at multiple monitoring locations. The system comprises pre-existing digital cameras and site hardware connected to a network that interfaces with a remote server. The server includes a processor and memory, a network interface for receiving image data transmissions, and a human interface device for displaying information and facilitating user interactions. The monitoring software component includes an adaptive object-detection function, which facilitates the method outlined above.

The system periodically executes image capture steps at each monitoring location using existing hardware. The server then conducts at least one contextualization step, detecting focus cues, calculating dimensions and locations of interest regions, and storing this data. The server also conducts a monitoring loop, detecting failure conditions in the captured images, and executes a notification step to alert users to potential issues. The monitoring software adapts based on user interactions, enhancing future object-detections.

The system supports multiple human interface devices, which may include remote client devices connected via a network. All embodiments and variations of the system, as disclosed, are understood to be within the scope of the present invention.

The method of remote visual inspection and failure detection at multiple monitoring locations using the system and hardware of the present invention is disclosed and encompassed herein.

DESCRIPTION OF THE DRAWINGS

The invention will now be described in further detail in reference to the following Figures, which describe embodiments of the system and method of the present invention as follows.

DETAILED DESCRIPTION OF ILLUSTRATED EMBODIMENTS

Figure 1:
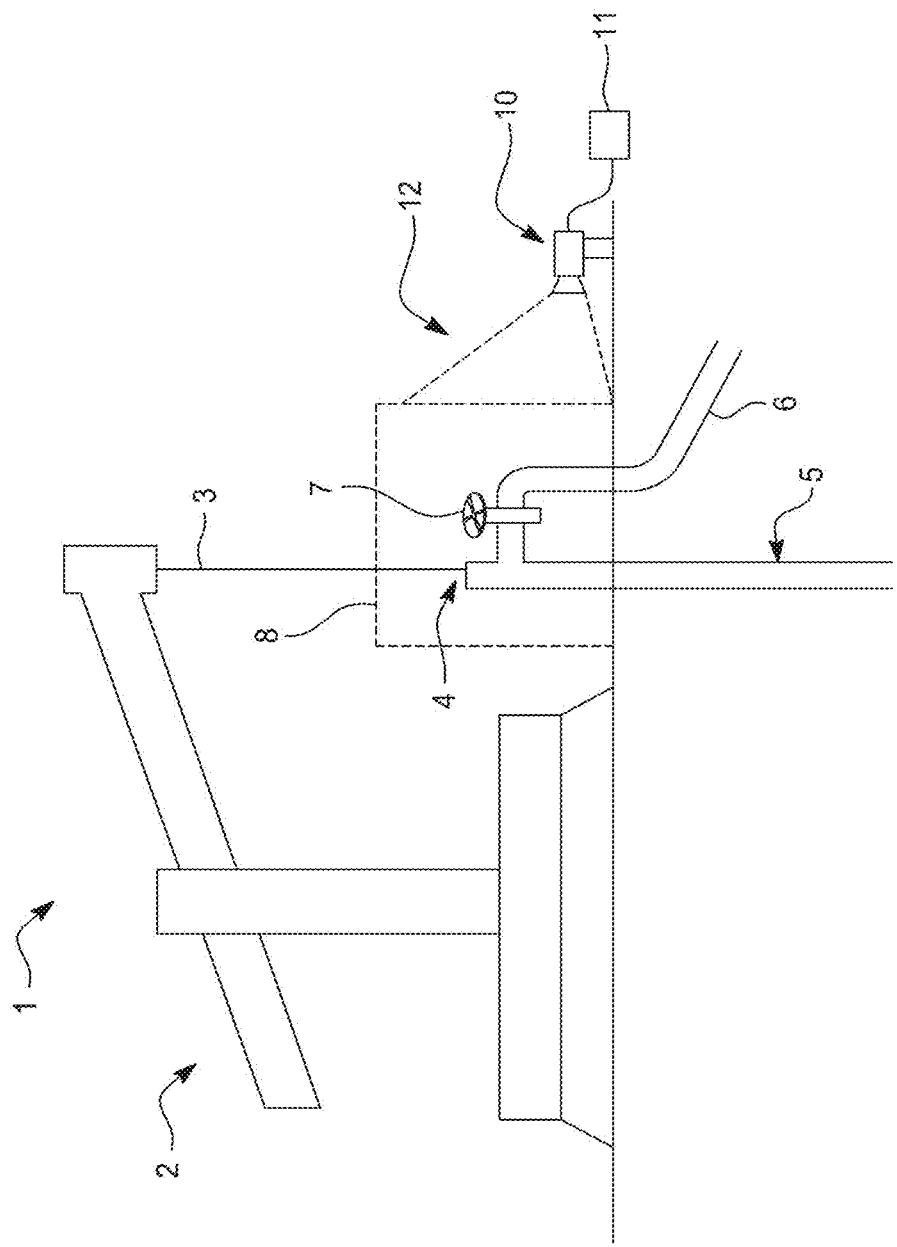
FIG. 1 is a schematic diagram showing a sample of a monitoring location equipped for monitoring in accordance with the method of the present invention.

As outlined, the system and method of the present invention pertains to the provision of an automated method of remote visual inspection and failure detection at a plurality of monitoring locations using a central server, and a monitoring software component which includes an adaptive object-detection function to identify areas of interest and potential failure attributes indicating potential failure conditions at the monitoring locations. For the purpose of outlining the operation and intended scope of the invention in further detail, we first provide some further context around some of the underlying concepts of the present invention, followed by a detailed description of the system and method.

Monitoring Locations:

One of the terms which is intended to be understood and required is that of a monitoring location. A monitoring location is any location at which it is desired to implement the remote monitoring system and method of the present invention, using a wirelessly connected monitoring system. It is specifically contemplated that the system and method of the present invention will be particularly applicable in oilfield and petrochemical production facilities and extraction facilities, for the monitoring of areas around wellheads, tanks, valves, pipelines and pipes etc. Any type of an industrial location requiring periodic visual inspection to detect evidence of retrospective leaks or failures or potential prospective leaks or failures of components will be understood to be within the scope of the intended types of monitoring locations at which the system and method of the present invention could be deployed.

Specific areas in respect of which it is desired to conduct monitoring for contamination include inside of an oilfield containment apparatus, around an oilfield wellhead, on oilfield piping and the like.

Monitoring locations are any type of a piping or commercial equipment installation within the general context of the disclosure outlined herein, wherein it has traditionally been the case that in person visual inspection has been conducted on a frequent or periodic basis to ensure that there are no indications of a failure or potential failure which might result in equipment damage, environmental damage or the like.

Interest Regions:

At each type of a monitoring location within the scope of those intended to be enhanced by the use of the system and method of the present invention, such as petrochemical and industrial oilfield applications etc., there are particular interest regions which are the areas of primary focus in the conduct of a visual inspection. For example in the case of the piping installation, pipe joints, pipe valves and the like are the areas of the highest potential likelihood of failure and thus these are the areas that are primarily inspected in the conduct of the physical inspection of the installation at that particular type of a monitoring location.

In an oilfield extraction application, the piping and equipment around the wellhead is potentially one of the highest probability failure areas and so that is the area that is carefully physically inspected.

In oilfield and other industrial tanking applications tank ports, areas where piping joins to the tanks or other similar joints or seams are the areas of most likely failure, spillage or leakage. In certain cases an entire monitoring location might comprise a interest region, where it is desired to monitor for vapors or other gaseous leakage etc.—in these types of applications, environmental sensors at the monitoring location would be a beneficial added feature of the system.

Referring to further types of monitoring locations, any type of a monitoring location in which equipment, tanks, piping or the like is located within an environmental berm for environmental spill protection, the entire circumference and integrity of the berm might be a further interest region for monitoring.

Any type of an area that a educated human inspector would focus on in the physical inspection of a particular monitoring location to detect the potential for a failure condition or the existence of the failure condition would be a interest region and similar to those interest regions being the areas of key importance in terms of physical inspection at the monitoring location site by human inspectors, the same interest regions are the areas of primary interest from the perspective of an automated image-based monitoring system and method such as that disclosed herein.

Cameras and Camera Views:

The present invention effectively consists of a server based monitoring method and system which will use an artificial intelligence based object-detection function to both identify and define interest regions for monitoring in the server-based method as well as to identify failure attributes of the use of those interest regions which would suggest the existence of the failure condition. As outlined throughout, various types of cameras could be used as well as various types of images, within the scope of the present invention. Typical digital cameras, which are widely available and cheap to acquire, could be used in conjunction with an appropriate capture bus and endpoint device to capture standard regular photography of particular views of a monitoring location for the purpose of the practice the present invention. In other applications, thermal or infrared cameras or other types of cameras could also be used with attendant modifications to the monitoring software component and the remainder of the method of the present invention, without departing from the scope hereof.

The cameras which would be used would capture either still images or video imagery of the monitoring location. It is particularly contemplated that the method of the present invention would be practiced using still images, which would minimize the amount of network bandwidth consumption required to practice the method where the monitoring locations are in remote areas where bandwidth is limited in availability and high in cost. It will be understood that video files could be used also, up to the point of real time video being monitored in accordance with the remainder of the method of the present invention, in applications where bandwidth was more freely available i.e. where the server was locally installed at a particular monitoring location of the local network bandwidth was only required, or where cost and availability constrictions did not apply to the availability of bandwidth. Both such approaches are contemplated within the scope of the present invention.

Cameras could be fixed cameras or they could be also allowed to move to capture multiple views of a particular monitoring location. It is particularly contemplated that in the most efficient and lowest-cost embodiments of the method and equipment of the present invention, fixed cameras which are effectively mounted in a fixed location with a fixed view of an area of interest at a monitoring location primary type of a camera which would be used. In embodiments of the method of the present invention relying upon multiple views or multiple images being captured in a particular monitoring location, cameras that were able to move between locations or shift their view to capture multiple images could also be used and again would be understood to be contemplated scope of the present invention.

The concept of a camera view is a key element of the method of the present invention—a camera view effectively comprises a particular view of a monitoring location from a particular camera location. At a particular monitoring location there will be at least one optimal location and direction for the mounting and direction of a camera to capture images that have the necessary view of interest regions therein, for the purpose of the monitoring method of the present invention. In certain cases, where multiple cameras are used or even in the case of a movable camera a single camera could also be used, to capture several camera views. In a monitoring location with several camera views, the several camera views could be views of multiple areas of concern with multiple interest regions for monitoring, or in certain embodiments also several camera views of the same general area of the installation of the monitoring location could also be used to enhance the level of accuracy and certainty of the predictions made by the object-detection function. The camera view effectively the view of the monitoring location which will be captured on an ongoing basis by a camera from a particular location. Since the camera view from a fixed camera would always be the same, it simplifies the process of identification and monitoring of the contents of interest regions at the location, since theoretically the same areas of each image captured with a fixed camera view are the areas which would be monitored to identify the failure attributes and failure conditions.

Object-Detection Function:

The key aspect of the software of the monitoring system of the present invention is an adaptable object-detection function, capable of the conduct of object-detection in images captured at one or more monitoring locations. The concept of object-detection technology will be understood to those skilled in the art—however, until the present time object-detection of failure attributes such as spills or the like has not been possible or has not been an area explored in the prior art, since it requires the application of significant learning and data to the function to provide a high level of certainty in spill predictions.

The object-detection function of the present invention will be used to identify equipment attributes or location attributes which comprise focus cues identifying interest regions for monitoring. By training the object-detection function to identify focus cues which indicate interest regions, the need for highly trained operators of the system at the time of the setup and configuration of particular monitoring locations is minimized, particularly as the function becomes more and more accurate over time in identifying such focus cues. Similarly, the object-detection function is capable of identifying failure attributes which indicate a failure of some type at the monitoring location—for example a spill, a fire, or even potentially of valve left in the wrong position by a maintenance crew or the like. Any such failure attributes indicating a potential for a failure or less than optimal operation at a particular monitoring location are failure attributes indicative of failure condition which the object-detection function present invention should be able to detect.

As will be detailed in further sections below, one of the key aspects of the object-detection function of the present invention is that it is contemplated to be adaptive that is to say that it will learn as object-detections indicative of focus cues or failure attributes are made in respect of captured images. Each time that a particular type of an object indicating a focus cue or an failure attributes is recognized and used in the monitoring method, displayed to a user for acceptance or rejection, the acceptance or rejection of those recognitions and detections can be used to fine-tune the behavior of the function in future object-detection passes. If a user is given the ability to accept or reject particular detections by the user interface of the human interface device and they do not override the recommendation or detection of any such objects, that positive indication of the accuracy of record will also be for this purpose. The monitoring software component of the present invention will, as outlined in further detail herein, be capable of storing the necessary information with respect to each object-detection conducted by the function and have the necessary programming to allow for re-rendering, fine-tuning or otherwise enhancing the mathematical model underlying the function based upon each set of data points to provide a higher level of accuracy and certainty.

In certain embodiments of the method of the present invention, the system might be modified to indicate on the graphic display to a user, either in terms of focus cues defining or indicating a interest region or failure attributes indicative of a failure condition, an indicator of the probability of accuracy of the function based upon past recognitions and the mathematical model—as the probability of accuracy of particular recognitions and detections increases, the graphic display to users of same can be altered and the behavior of the monitoring software component and the remainder of the method could also be enhanced.

In terms of the processing of image data the images, be they photographs or video, would be compared against one or more artificial intelligence or image processing data models for object detection, classification and texture recognition. It will be understood that a high number of different types of image processing algorithms or intelligence models could be created for use in accordance with the method of the present invention—to recognize particular types of objects or textures in images based upon the quality and format of the images as well as the type of anomalies it was desired to detect. Any type of an image processing algorithm or mathematical function capable of detecting particular objects or textures or other items in images which could identify safety failure anomaly such as those desired to be identified in accordance with the remainder the myth of the present invention are all contemplated within the scope hereof.

Focus Cues:

As outlined in further detail throughout, focus cues within an image captured of a particular camera view are contemplated to be particular objects or items which can be recognized in an image at a particular monitoring location which might be indicative of the existence and location and size of a interest region at the monitoring location and in the captured image for further monitoring. For example, the presence of a valve or particular piping configuration, the presence of an environmental berm which needs to be monitored for breaches and spillage, tank flanges and the like, and any number of different types of equipment or indicators in a particular image can be used to identify, based on programmed understanding of particular types of monitoring locations, the interest regions that need to be monitored in accordance with the method of the present invention for the purpose of most quickly identifying the potential existence of failure conditions.

It will be understood that the types of focus cues that might indicate the presence of a interest region will vary based upon the type, size and location of the monitoring location in question and that any type of a focus cue being an aspect of an image which can be detected by the object-detection function and understood by the function and the remainder of the monitoring software component to indicate the existence of a interest region are all contemplated within the scope hereof.

Object-detection functions can identify the presence of particular shapes or objects in an image. Specifically then, the system can be programmed in respect of particular types of industrial installations to recognize particular types of objects which would indicate the presence of a interest region—valves, connections, seals and the like. Once the system is pre-populated with some general guidelines in the function as to the types of items to be recognized, as more object-detections are conducted and ratified or rejected, the adaptation of the function to incorporate the accuracy and certainty of those previous object-detections can enhance the functionality of the system. The system might include, if necessary or desirable for the administration and operation of the function database of focus cue information in respect of different types of industrial installations, which would provide the basic data set for use by the monitoring software component to identify focus cues in extracted images. The contents of that database along with extracted identified image information etc. for identified and ratified focus cues can be used by the function and the monitoring software component in subsequent object-detection operations to enhance the accuracy and the breadth of recognition possible with the function and the monitoring software component.

As the system and method of the present invention is executed, and object-detections and recognitions are made which result in the calculation of location and size of particular interest regions in respect of camera views of cameras connected to the system, the type and nature of the focus cues can also be used to add to and enhance the behavior of the adaptive object-detection function and provide a higher level of certainty and accuracy in the selection and creation of interest regions in respect of particular camera views for adoption or modification by the user.

Dependent upon the type of a user interface provided, when particular focus cues used in the calculation and location of particular interest regions in the camera view image are displayed to a user, the system could also allow the user to elements of the image which were not predicted by the function to be a focus cue in respect of the particular type of installation at the monitoring location, and the manual selection of additional focus cues by the user could be used to further enhance the recognition model of the function and heighten the level of accuracy and certainty in future recognitions.

More than one focus cue could be used to identify the existence and position of a single interest region in a camera view, or individual focus cues detected in a single camera view might also indicate the presence of multiple interest regions for monitoring. Again, the adaptation of the object-detection function based upon recognitions and user interactions will maximize the likelihood of success in the determination of the existence of interest regions and the definition of interest regions related thereto. Any type of an object or image characteristic capable of indicating the existence of a interest region could be a focus cue as contemplated by scope and intention of the present application.

It is also specifically contemplated that the user interface provided to a user in certain embodiments of the system and method of the present invention can permit a user to manually identify a focus cue in a particular type of an image to allow for enhancing the scope of the types of focus cues be recognized by a particular embodiment of the monitoring software component. For example, user in reviewing a graphic display of a particular extracted image and the identified focus cues identified by the system could, in the appropriate rendering of the software in the system, be allowed to manually select additional items within the view, that were not known to the system to be a focus cue, and subsequent adaptations and iterations of the function would then begin to recognize and learn that type of an object as well.

Interest Regions:

The interest regions in a particular camera view of the monitoring location are the areas most likely to experience a failure or detection event that is desired to be captured. The interest regions in a particular image would be sized and located by the monitoring software component of the present invention based upon the presence of one or more focus cues in the image. The specific types of focus cues which could be recognized by the object detection function of the present invention to signify the presence of an interest region would be selected from the group of:
  a. detected interfaces between equipment and the environment;
  b. detected interfaces between components of equipment;
  c. elements of the surrounding environment;
  d. detected equipment which has a purpose related to leak containment, mitigation, fluid presence or tank levels; or
  e. physical framing elements positioned in the view of the corresponding cameras.

Based upon the detection of any of these types of focus cues, the software of the present invention could determine the existence of an interest region to be visibly monitored in accordance with the remainder of the method.

Failure Conditions:

A failure condition is any type of a condition at a monitoring location which would require inspection, either remotely by human, or in person by attendance at the monitoring location. The concept of the system and method of the present invention is to detect, within the interest regions of a camera view, the existence of one or more failure conditions and which require a follow-up human inspection. Any type of a condition and monitoring location, which will vary depend upon the types of locations and equipment, which would require human overview would be within the scope of failure conditions as outlined herein. Failure conditions, as the terminology is chosen, are indicative of any condition requiring further inspection including actual conditions which could be suggestive of all of equipment failure through to conditions simply requiring inspection to maximize or enhance safety or efficiency of operation and the like. The scope of the context intended for this term will be understood to those skilled in the art of facilities monitoring and instrumentation in this field and any type of falls within this general category is intended to be within the scope of failure conditions meant to be detected by the system and method of the present invention.

In a prior art context, many types of failure conditions can be detected by visual inspection and it is the substitution of the system and method of the present invention for a prior art human visual inspection methodology, leading to the detection of these types of failure conditions, which is contemplated. Basically upon a human inspection and inspector will be able to notice certain visual attributes of the equipment at a monitor location which will be indicative of the existence of the failure condition. The visual attributes of the equipment which are indicative of the existence of the failure condition are the failure attributes which are desired be captured and identified by the object-detection function of the software to present invention, as a first category or first line of monitoring in advance of the need for an in person or remote human inspection.

Similar to the focus cues, attributes suggestive of failure conditions could be anything from the detection of a spill on the ground surface within a particular interest region, the presence of condensation or the like on a particular surface etc. through to a breach of an environmental berm or the like resulting in a spill. It is also specifically contemplated that failure attributes suggesting failure conditions could even include visibly detectable equipment settings that were not otherwise instrumented—for example failure attributes could include the identification of the position of a particular valve in an open or closed position following a maintenance operation or the like, which could also be used to indicate a potential for failure, accident, or less than optimal performance.

Attributes of extracted images which might signify the presence of a failure condition include the following:
a. color contrast in the image;
b. colors within the image;
c. textures within the image;
d. relative position of detected edges in the image;
e. relative orientation and angle of edges or contrasting regions in the image; or
f. identification of data patterns correlating to failure conditions.

Figure 7:
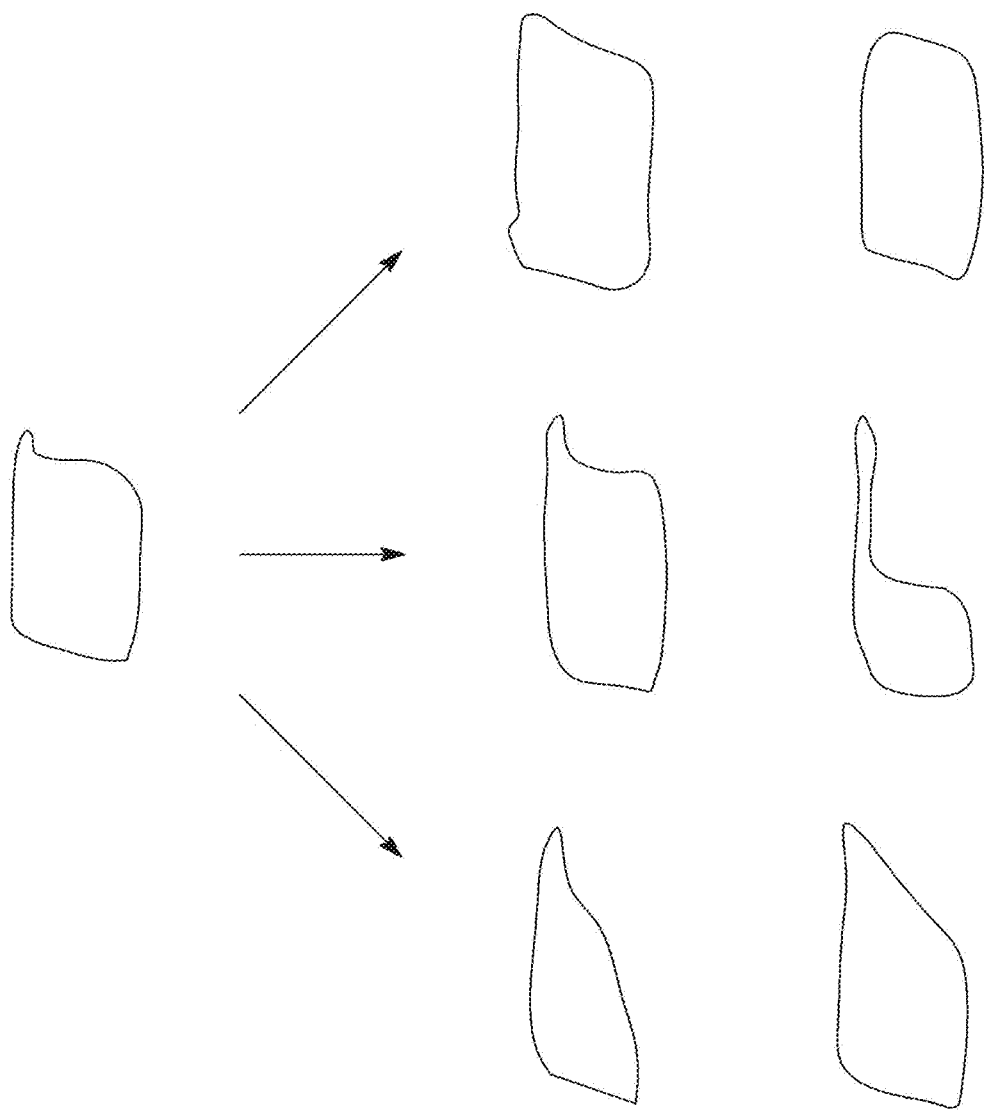
FIG. 7 demonstrates a sample of a plurality of different shape recognitions which might be made by the object detection function in computation of the existence of failure conditions in an extracted image.

FIG. 7 shows a sample of a series of shapes demonstrating the behaviour of a sample of an object detection function—which might be used to compare items appearing in images to detect the presence of a particular type of coloured object or texture indicating an anomaly requiring further inspection.

Based upon the application of these prediction models to the images, if an anomaly was detected, and anomaly notification could be presented to a user via the interface of the user device for further review. It will be understood specifically that the image detection and prediction algorithms which are used could be programmed in such a way that they could learn and refine their detection abilities based upon user feedback received to anomalies detected.

System Overview:

Referring to FIG. 1 there is shown a schematic drawing of one example of a monitoring location which is instrumented for monitoring in accordance with the method of the present invention, as well as the related embodiment of a system in accordance with the present invention. There is shown a sample of a monitoring location which is, demonstratively, a remote pumping and extraction facility oilfield, with a pump jack extracting oil from a well using a vertically reciprocating pump, into a pipe and towards a tank etc. The monitoring location 1 as shown, includes the vertically reciprocating pump jack 2 which is operatively connected to a pumping shaft 3 extending through a packing and fittings 4 at the wellhead of a downhole tubular 5. A take away conduit 6 is a pipe through which the extracted oil is pumped into local or remote storage. The take away conduit 6 includes a valve 7.

Generally speaking, in a traditional sense where physical inspection was taking place at this monitoring location 1, human inspectors would inspect the area around the wellhead fittings 4, and the joint of the wellhead tubular 5 to the take away conduit 6, as the area most likely to exhibit a failure, or leak or the like. In the context and terminology of the present invention this area, generally shown within rectangle 8 is the interest region to be monitored.

There is shown a digital camera 10 connected to an endpoint device 11. The digital camera 10 which is shown is in a fixed position with the camera view 12 towards the rectangle 8. The endpoint device 11 includes a wireless network interface to a network by which the endpoint device 11 can communicate with a server. The system and method of the present invention could be practised either with a proprietary digital camera 10 and endpoint device 11 combination capable of communicating with the server, or in other cases it is contemplated that the server of the present invention would communicate via its network interface with pre-existing digital cameras 10 etc. or sources of digital imagery from a particular site. Both such approaches are contemplated within the scope of the present invention. The use of pre-existing cameras or camera feeds from third-party hardware may be capable of facilitating a wider adoption of the method of the present invention even the preexistence of that hardware at the monitoring locations.

Figure 2:
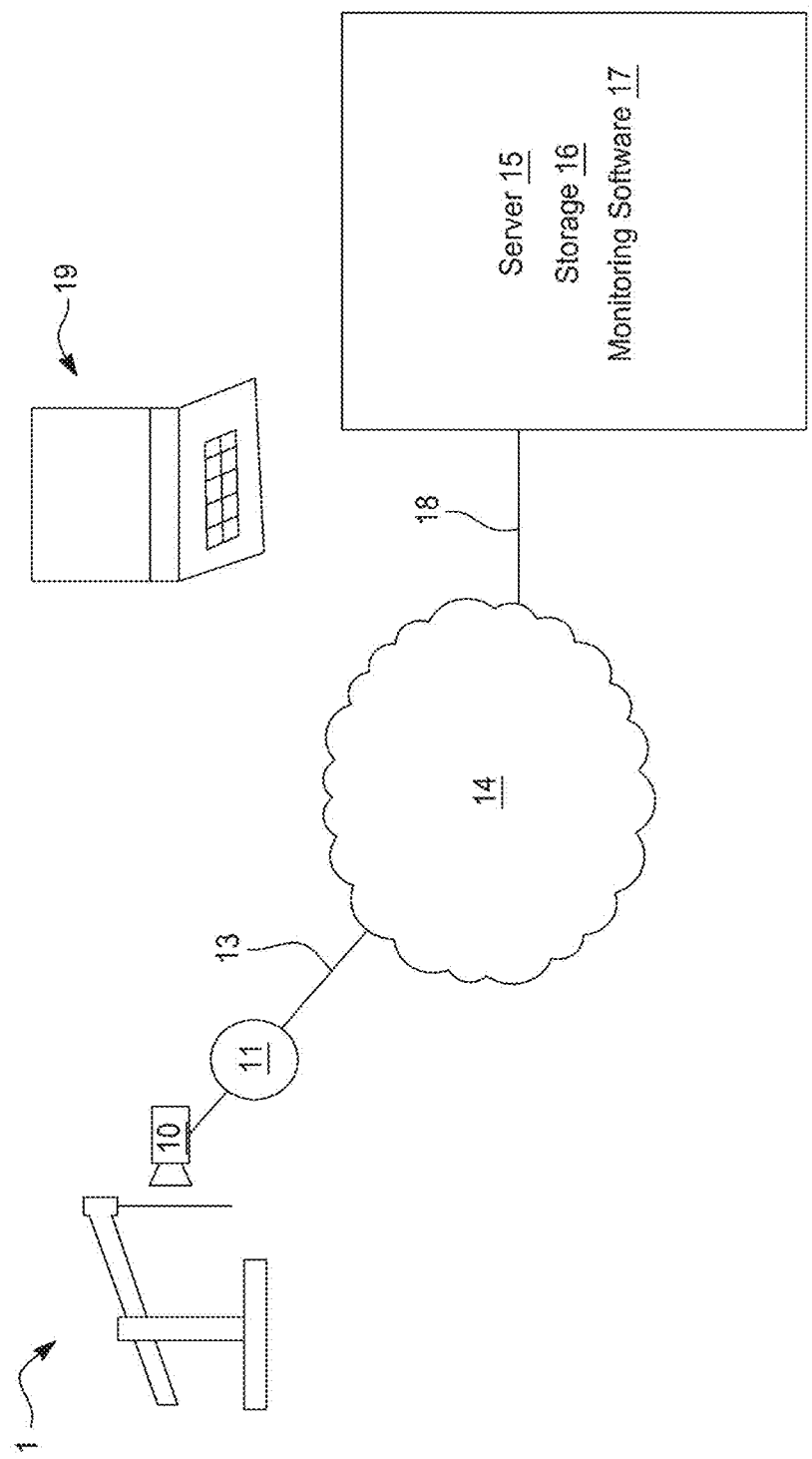
FIG. 2 is a schematic diagram showing an embodiment of the complete system of the invention for use at the monitoring location of FIG. 1.

Referring to FIG. 2 there is shown the remainder of an embodiment of a system in accordance with the present invention, and a single monitoring location 1 as shown in Figure the single monitoring location 1 again shows the endpoint device 11 with a single digital camera 10 attached thereto, and having a network interface 13 connected to a network 14 which allows communication with the server 15. As outlined above, in many cases the server-based system of the present invention as claimed would be practised relying upon camera feeds from pre-existing cameras 10 and necessary endpoint devices 11 or network interfaces 13. The server 15 includes a network interface number 18 as well. Also shown attached to the server 15 is a human interface device from 19 which in this case is a locally connected monitor and keyboard.

Key components of the server 15 include memory or storage 16 which would hold the processor instructions comprising the monitoring software component 17 as well as whatever other data and processor instructions were required to be stored for operation of the server 15, adaptation of the function within the monitoring software component 17 as well as any short-term or long-term storage of the results of object-detections conducted by the monitoring software component 17 for the purposes of the subsequent adaptation of the function to enhance its accuracy.

Figure 4:
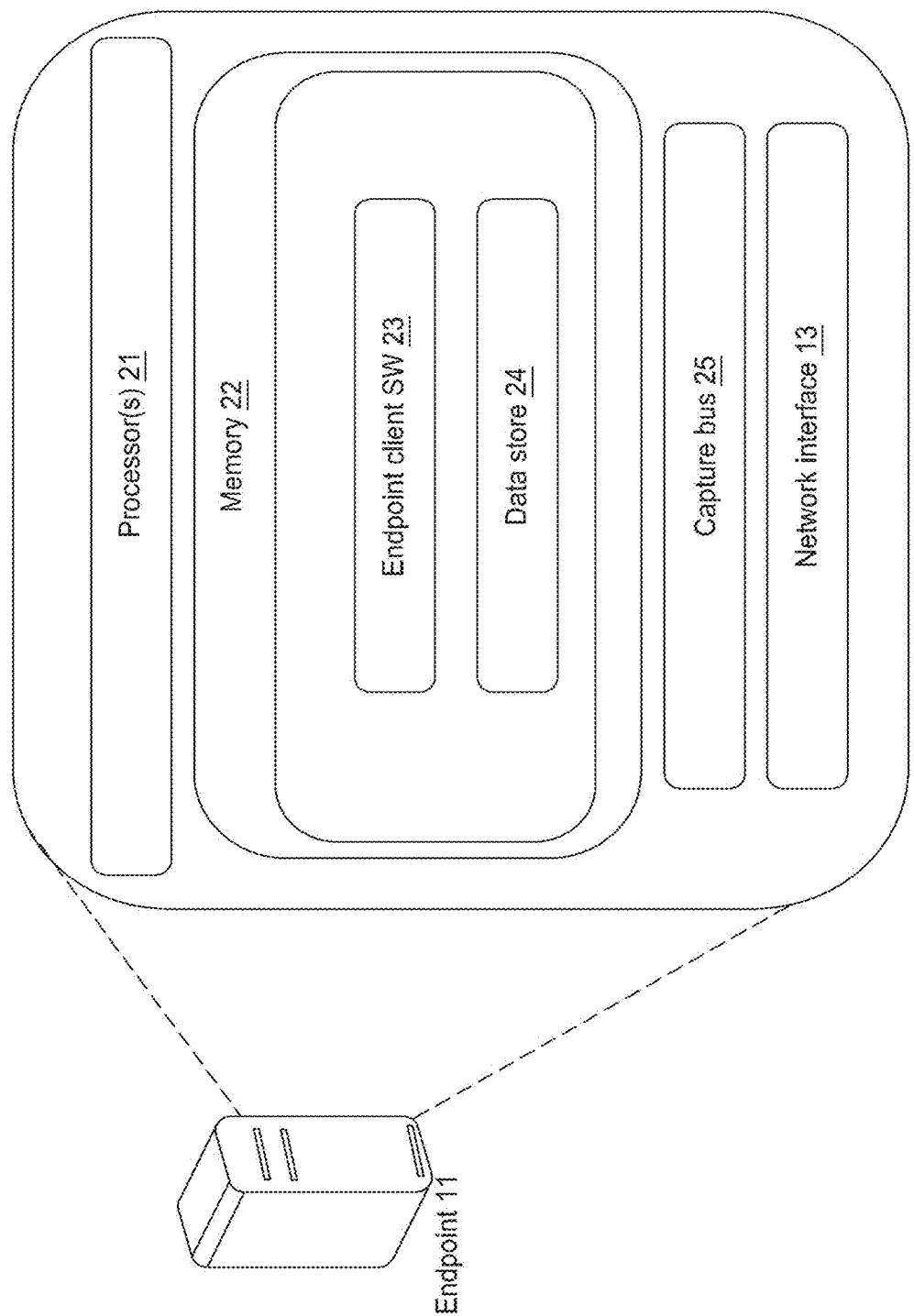
FIG. 4 is a block diagram demonstrating the components of the sample embodiment of an endpoint device in accordance with the present invention.

The endpoint device 11 is also shown in embodiments of FIGS. 1 and 2. A sample schematic diagram showing the different typical components of an endpoint device in accordance with the present invention is shown in FIG. 4.

Figure 5:
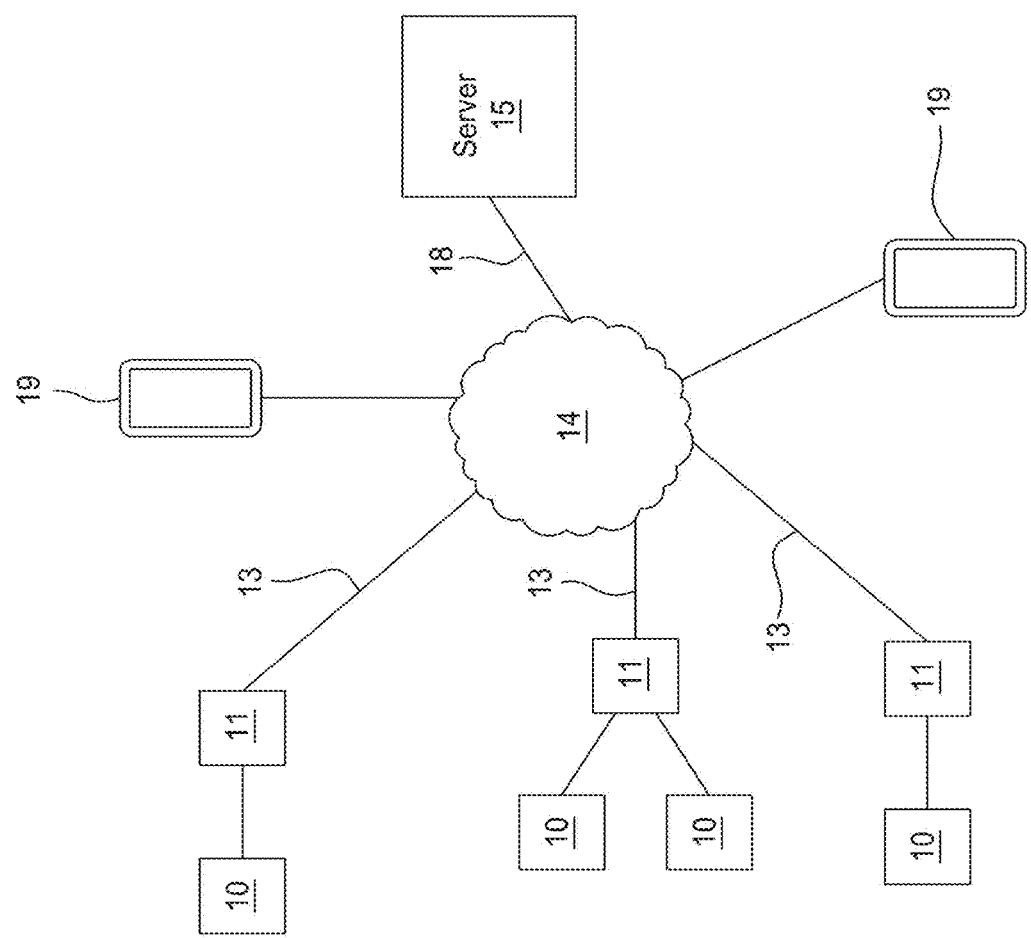
FIG. 5 is a schematic diagram showing one embodiment of a system in accordance with the present invention, with a plurality of monitoring locations and a plurality of human interface devices.
Figure 6:
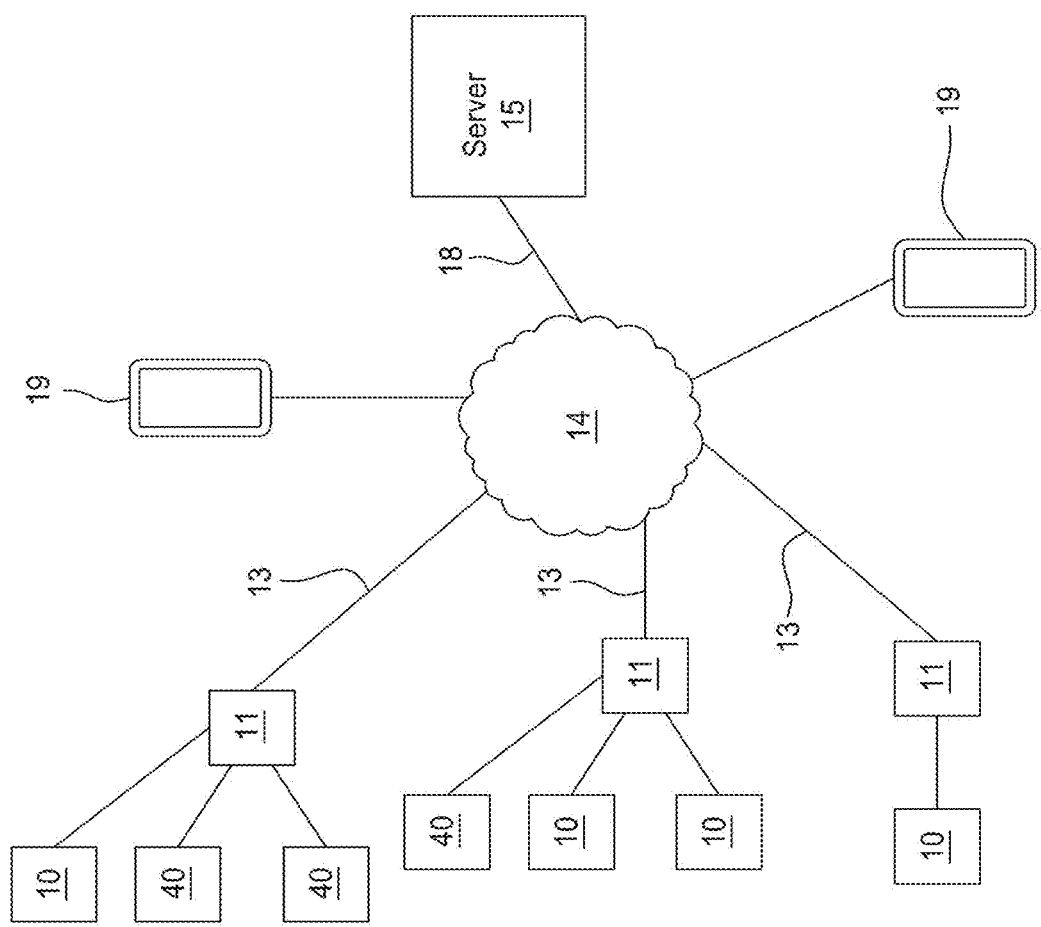
FIG. 6 is an alternate schematic diagram of the system of FIG. 5.

FIG. 5 demonstrates an alternate embodiment of the system in accordance with the present invention, intended to demonstrate the preferred service bureau approach to the offering of the system and method of the present invention there is shown a plurality of monitoring locations 1, each of which is instrumented with an endpoint device 11 and at least one digital camera 10. The second monitoring location 1 include two cameras 10, to demonstrate possibilities of multiple cameras 10 in a single monitoring location 1.

Each of the three endpoint devices 11 shown connected via the network 14 to the server 15, using their network interfaces 13.

For the purpose of demonstrating the use of multiple human interface devices 19, are shown in this Figure are remote client devices also operatively connected to the server 15 by the network 14. Two human interface devices 19 comprising remote client devices are shown—in each case, a smart phone is shown as the remote client device although as will be understood any number of other different types of hardware devices capable of communicating with the server 15 and providing the necessary interaction and visual display to a user to facilitate the operation of the method of the present invention will be understood to be contemplated within the scope hereof.

Figure 3:
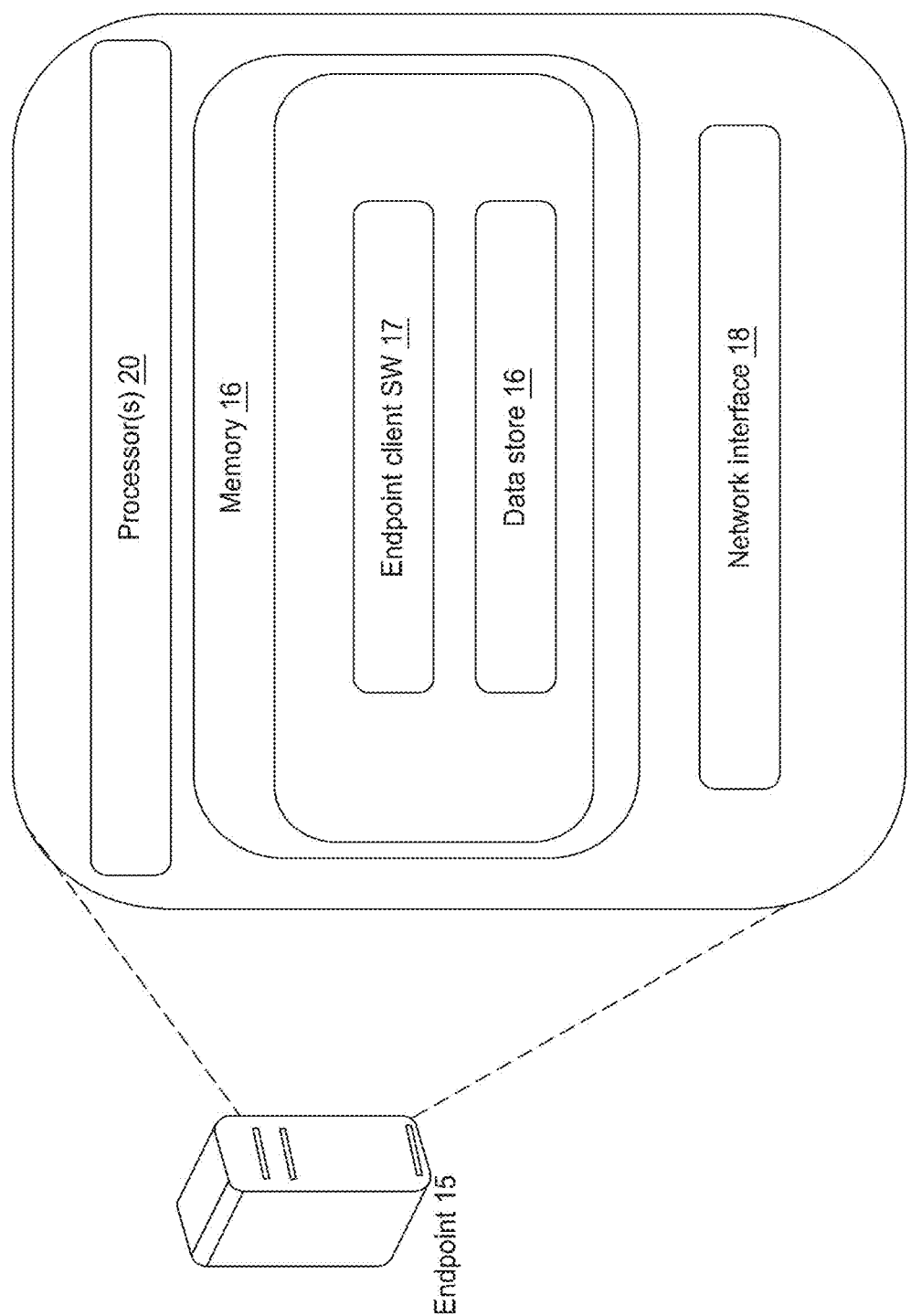
FIG. 3 is a block diagram demonstrating the components of a sample embodiment of a server in accordance with the present invention.

Server:

The server 15, sample embodiment which is demonstrated FIG. 3, might consist of one or more servers—a single server or server farm approach. Server 15 would comprise one or more processors 20, as well as memory the memory 16 might include various processor instructions for the method of the present invention or otherwise in operating the server processor instructions corresponding to the monitoring software component 17 are shown stored within the memory by machine-readable instructions which may include one or more instruction more of server firmware and operating systems, the monitoring software will 17 and/or other instruction components.

Memory 16 could also include a data store 30 for the storage of various information and data generated during the operation of the method were required for the operation of the method of the present invention.

Memory 16 might comprise non-transitory storage media that electronically stored nation. Electronic storage media and we 16 might include one or both of system storage provided integrally with the server 15 and or removal storage that is removably connected to the server via for example a port or a drive. Memory 16 might include one or more of optically readable storage media, magnetically we its, electrical charge based storage media, solid-state storage media or other electronically readable storage media. Memory 16 may include one or more virtual storage resources i.e. cloud storage, VPN storage of the memory 16 might store software function by the processors 20, information received from and/or other information that enables the server 15 to function as described this document.

The processor 20 might be provide information processing capabilities in the server 15 might include one or more of a digital processor, and analog processor, digital circuit design and process information and analog circuit designs designed to process information and/or other mechanisms for electronically processing information.

Besides the general operating system instructions, the server 15 would include rise and monitoring software will 17 responsible for execution of the process and method of the present invention and the server 15 and coordinating communication with endpoint devices 11 and or human interface devices 19. The monitoring software can 17 itself might act as the interface with the data store 30, or the server software interfaces to the data store 30

The monitoring software component 17 would comprise subroutines to administer the data stored 30, create, modify and process data transactions and record the data store 30 and any additional numerical transactions and mathematical operations in support of the adaptive object-detection function and the like.

The server 15 also includes at least one network interface 18 by which to communicate with the endpoint devices 11 and in some embodiments the human interface devices 19. The particular hardware and software requirements of the network interface of this nature will be understood to those skilled in the art of hardware design in any type of an interface capable of the necessary number of networks to facilitate these communications are all contemplated scope of the present invention.

Endpoint Device:

The endpoint device 11, as demonstrated in the embodiment of FIG. 4 and otherwise, effectively comprises a hardware interface between at least one digital camera 10 positioned in respect of the monitoring location, and the server 50 via a network interface. The endpoint device 11 can PC or similar computing device capable of creation with the necessary additional hardware at a monitoring location 1 and both such approaches are contemplated within the scope of the present invention.

Referring momentarily specifically to the demonstrative elements of the endpoint device 11 shown in FIG. 4, the input device 11 includes a processor 21 and memory 22. Member 22 includes endpoint client software 23 required to facilitate interactions between the endpoint 11 and the server 15. Also shown is a data store 20 for additional information temporary image storage and the like could take place.

Certain embodiments of the endpoint 11 may include or not include a specific separate data stored or and all such variations and modifications will be understood to be within the scope of the present.

Also shown is the capture bus 25, which is a communication bus of the endpoint 11 capable of connection to an communication with the at least one digital camera 10.

Finally shown in this Figure is a network interface 13 by which the endpoint device 11 can communicate via a network 14 with the server 15. The endpoint device 11 would include a power supply and other basic components of a computing device as would be required and understood to those skilled in the art.

Endpoint Client Software:

The endpoint client software 23 will primarily be responsible for the facilitation of the method of the present invention from the endpoint device 11 end. Specifically, the endpoint client software 23 will be responsible for the periodic execution of the image capture step of the method of the present invention, wherein an image can be captured from at least one digital camera 10 connected to the capture bus 25 of the endpoint device 11, and the image data corresponding to each captured image can be then processed into a data packet for transmission to the server 15 as an image data transmission. A prepared image data packet representing an image data transmission can then be transmitted to the server 15 via the network 14.

In addition to actually capturing images from the digital cameras 10 connected to the endpoint device 11 by the capture bus 25, the endpoint client software 23 could also be programmed to include the necessary monitoring criteria or timing criteria to periodically trigger an image capture step.

In embodiments of the system of the present invention where an endpoint device 11 had more than one digital camera 10 connected thereto, a particular image capture step executed by the endpoint client software 23 might always include the capture of images from all of the digital cameras 10 connected to the endpoint device 11 such that a particular image data transmission to the server 15 included multiple captured images for processing, or in other embodiments, the endpoint client software 23 might capture individual images from individual digital cameras 10 connected thereto and might send individual image data transmissions to the server 15 in respect of each captured image. Both such approaches are contemplated within the scope of the present invention.

Monitoring Software Component:

The monitoring software component 17 operating server 15 is the key component necessary to practice the method of the present invention. The monitoring software component 17 comprises the necessary processor instructions to aid the processor 20 of the server 15 in the conduct of the various steps of the method of the present invention and specifically contains the adaptive object-detection function mentioned throughout which is used to identify focus cues and failure attributes within extracted images.

In operation, the monitoring software can capable of One of the key aspects of the monitoring software component of the system and server of the present invention is that the monitoring software component can adapt the object-detection function based upon previous positive or negative recognition results, user interactions and the like. By adapting the object-detection function over time, the ability of the function and the software and system of the present invention to make accurate predictions of interest regions as well as failure attributes identifying failure conditions will get better and better as the system is used in respect of any manner of kinds of monitoring locations.

Programming the monitoring software component and the adaptive object-detection function in a way that the function can be adapted over time will be understood to those skilled in the art. Details of object-detections made by the function, along with user interactions to accept or reject those detections or even the lack of user interactions to modify detections made will all be data points which can be saved in the process a method of the present invention and used to modify the mathematical model of the function and enhance its performance in intended application. Following the incorporation of such data points saved in the memory of the system into the model of the function, the data points might be maintained in longer-term storage or might be deleted— both such approaches are contemplated within the scope of the present invention Sensor Data Stream:

As outlined above, certain embodiments of the system of the present invention might include at least one sensor 40 connected to capture bus 25 of an endpoint device 11, whereby sensor readings of environmental or operating parameters of the equipment at the operating location 1 could be transmitted along with captured image data to the server 15 in image data transmissions for use in the recognition of failure attributes in images. The sensors 40 might comprise temperature sensors, pressure sensors, power consumption sensors or any number of different types of sensors which could capture relevant information regarding the environment or operating equipment at the monitoring location 1 and all such sensor types are contemplated within the scope of the present invention. Instead of a specific independently located sensor 40, the sensor 40 could also comprise the connection of the capture bus 25 of the endpoint device 11 to a pre-existing instrumentation datastream at the monitoring location 1—for example many monitoring locations 1 might already certain types of instrumentation and sensors that are already built-in and the system could allow for the inclusion of instrumentation data related thereto by facilitating a connection of the capture bus 25 of the endpoint device 11 to the instrumentation located at the monitoring location. This will also be understood to be within the scope of the present invention.

When one or more sensor readings from a sensor 40 at the monitoring location 1 are transmitted to the server 50 by the endpoint device 11 of the same time of the captured image from a digital camera 10, the sensor readings could be by the object-detection function and the remainder of the monitoring software component 17 to enhance the reliability and certainty of visual inspection otherwise generated by the software component 17 in the detection of failure attributes and the like.

Also, when a failure attribute is identified by the monitoring software component 17 and either accepted or rejected by user interaction with the server 15 by human interface device 19 when such identification is displayed to the user for verification and use, if the detected failure attribute is accepted or rejected by the user, the sensor readings from the at least one sensor contribute to the level of certainty and determination of the presence of such a failure attribute in the extracted image could be stored along with the remainder of the user interaction information for use in the subsequent adaptation of the function to enhance its future certainty in the identification of failure attributes. Various approaches can be taken to the incorporation of sensor data in the selection and verification of visual failure attribute cues in extracted images as well as to the enhancement of the accuracy of the adaptive object-detection function for future use based upon sensor readings captured and used by the function in the monitoring software component 17 the selection identification of failure attributes and all such approaches are contemplated within the scope of the present invention.

Human Interface Devices:

Various embodiments of the system and method of the present tension will include at least one human interface device operatively connected server, for the purpose of displaying information in the course of the method to a user in respect of an monitoring location, as well as to permit user interaction with the server to allow for the acceptance or rejection of various object-detection results generated by the function displayed to the user course of the identification of interest regions, or failure indications and failure attributes detected in captured images from an endpoint at the monitoring location or locations.

In the case of a standalone installation, with a single server serving one or more monitoring locations of a single user, the human interface device may comprise a monitor and keyboard or the like directly connected to the server allowing the server to directly display information and interact with the user regarding object-detection results. FIG. 2 shows a sample embodiment of a system in accordance with the present invention having a single human interface device being a locally connected monitor and keyboard as an example.

In other embodiments it is specifically contemplated that the human interface devices used in embodiments where a plurality of monitoring locations of a plurality of users are being monitored, requiring reporting of results to different individuals for human verification and the like, the human interface devices might actually comprise remote client devices operatively connected the server via the network— the remote client devices might comprise smart phones, tablets, computers and the like. Those remote client devices might through a locally installed software application, or by browser communication with the server, being a server having Web server components, allow for the remote and likely wireless display of particular monitoring results to the display of the device of a remotely located user, for verification and follow-up human inspection. It will be understood that any type of a remote computing device which is connectable by the network to the server and capable of interacting with the server either by a locally installed application or through browser interface etc. could comprise a human interface device within the intended scope of the present invention and all such devices and remotely installed software and the like are contemplated within the scope of the types of human interface devices contemplated within the scope of the present invention.

Figure 8:
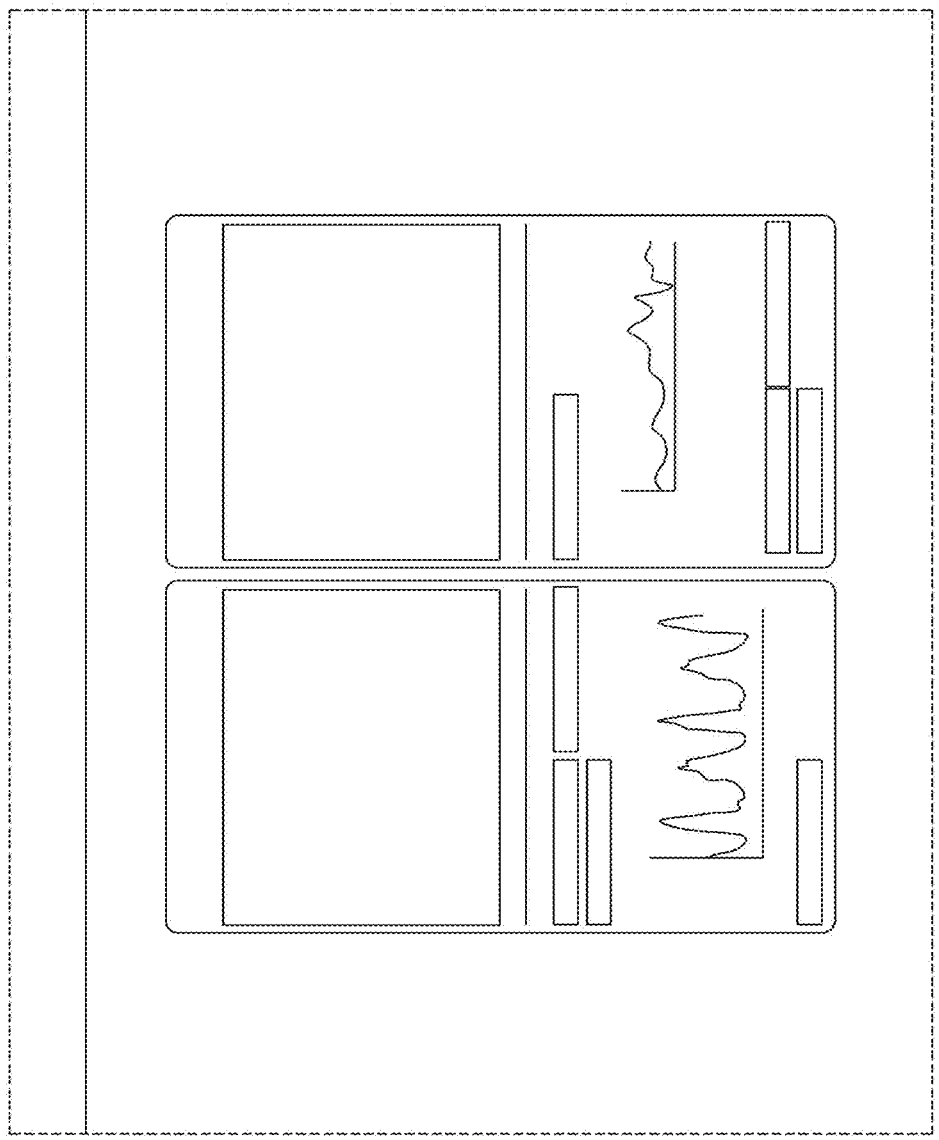
FIG. 8 is a screen shot of a sample display to a user via a human interface device upon the detection of at least one failure condition.

FIG. 8 is a sample of a screenshot of a human interface display showing a detected failure condition at a particular piping installation.

Network Interface:

The network interfaces of the endpoint hardware devices as well as the server will be understood to be network interfaces capable of connection to a local area or wide area computer network enabling communication between these devices. It is specifically and primarily contemplated that the endpoint devices will communicate over a wireless network interface with the server—probably by a wireless Internet connection. However it will also be understood that a closed network could be used and that any type of a wired or wireless network connection permitting communication between the endpoint devices and the server and thus enabling the practice of the method of the present invention will be understood and contemplated to be within the scope of the present invention.

A local area network or wired network connection might particularly be used in the case of a large single monitoring location which had multiple endpoints or multiple cameras and a complicated hardware configuration with a locally hosted single server. In the more likely embodiments of the system and method of the present invention, namely the operation of the method and the server in a service Bureau configuration, wherein multiple users with multiple monitoring locations could share access to a single server operating the image detection method of the present invention, wireless network interfaces the more likely approach to be taken.

In embodiments of the system and method of the present invention human interface devices comprise at least some software interfaces on remote client devices operably connectable to the server by a network as well, the same or an additional network interface on the server could be used to allow the server to communicate with such remote client devices also.

Any type of a private or public network capable of allowing communication between the server and the endpoint devices or human interface devices will be understood to be a network contemplated within the scope of the present invention.

Figure 9:
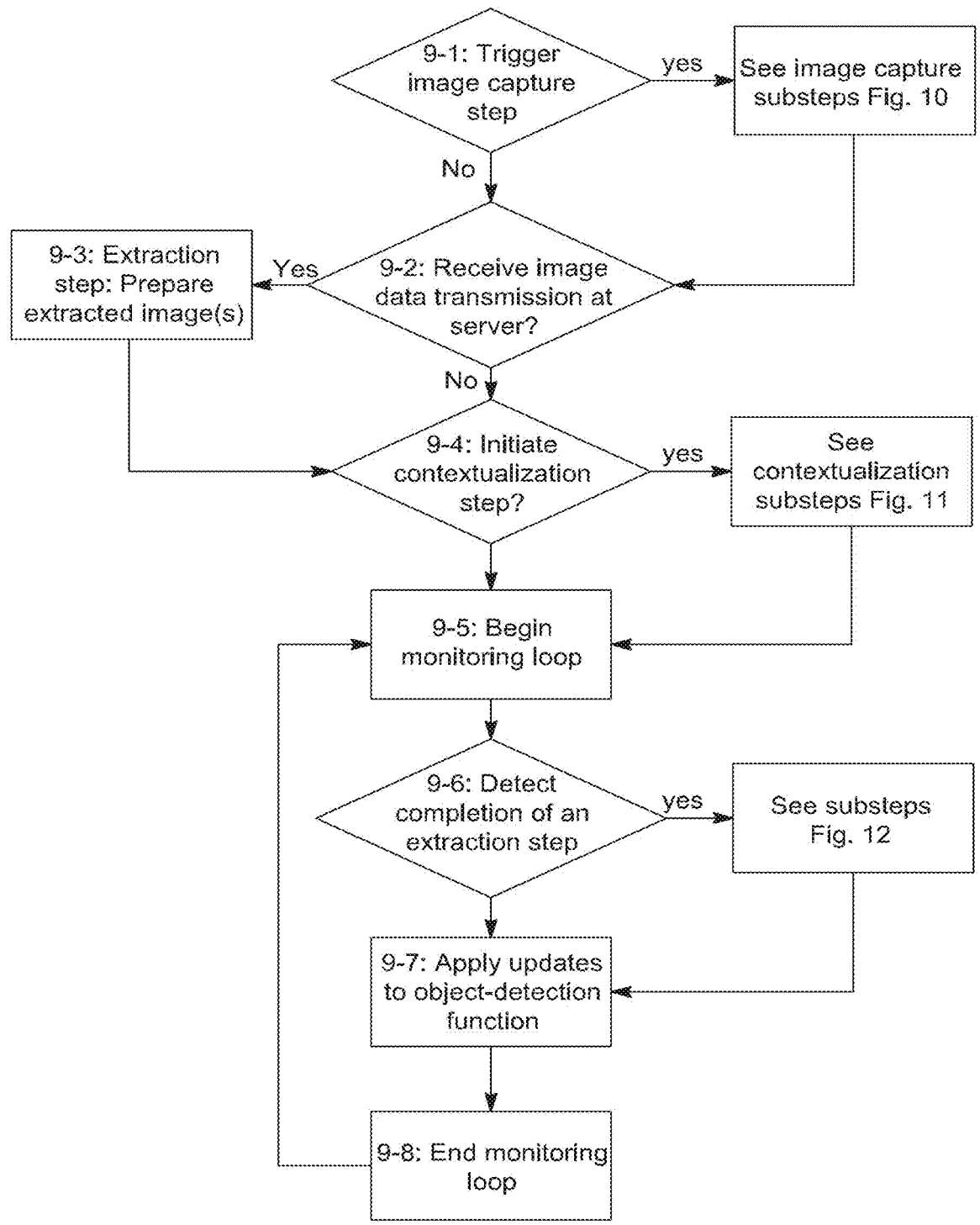
FIG. 9 is a flowchart demonstrating the steps in a basic embodiment of a method of the present invention.

Method Overview:

The system of the present invention as described above is used to practice the method of computer-assisted visual monitoring of oilfield installations and the like to detect based upon visual inspection the presence of potential failure conditions requiring a further human inspection. Referring first to FIG. 9 there is shown a flow chart demonstrating the steps in a first embodiment of the method of the present invention.

The method is practised using a system in accordance with the present invention such as those otherwise outlined herein, specifically comprising a server, and endpoint device at each monitoring location being monitored, and at least one human interface device capable of receiving notifications and permitting user interactions with the server to accept, reject or modify particular recognitions, detections or recommendations made by the system.

Figure 10:
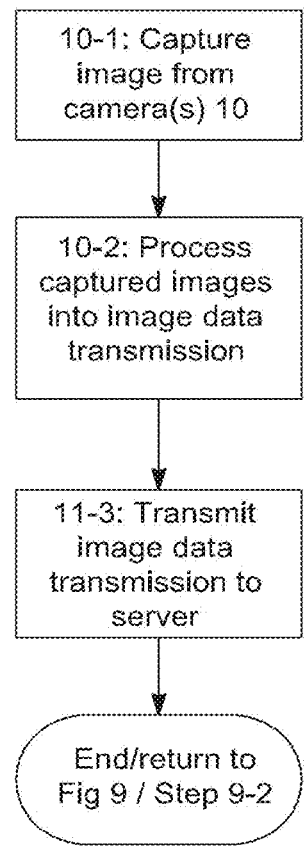
FIGS. 10 through 12 demonstrates sub-workflows of the primary method of FIG. 9.

The method will be executed by, in a first step, periodically executing an image capture step at each endpoint device—shown at 9-1. On the triggering of an image capture step the substeps of that process are shown in FIG. 10—the endpoint device 11 using the endpoint client software 23 would capture an image from at least one digital camera 10 connected to the captured bus 25 of the endpoint device 11. This image capture is shown at step 10-1. The image capture step 9-1 could, as outlined elsewhere herein, be triggered manually, periodically on the schedule, or based upon a sensor input or detection of some other condition at the monitoring location.

Where an image capture step is detected or triggered, shown at step 9-1, the substeps of the workflow associated therewith include first capturing an image from one or more cameras 10 connected endpoint device 11, shown at step 10-1 of FIG. 10. Following the capture of the images or images from the cameras in question, the captured images would be processed into an image data transmission, shown at step 10-2 and transmitted back to the server—step 10-3. Following the completion of this sub method, the control of the primary method would return to that of FIG. 9.

Upon the receipt of any image data transmission at the server, shown at step 9-2 as a decision block, if an image data transmission was received, extracted images would be extracted from the image data received in an extraction step 9-3. Upon the detection, completion or existence of one or more extracted images from the extraction step 9-3, further steps in the method could be conducted.

Figure 11:
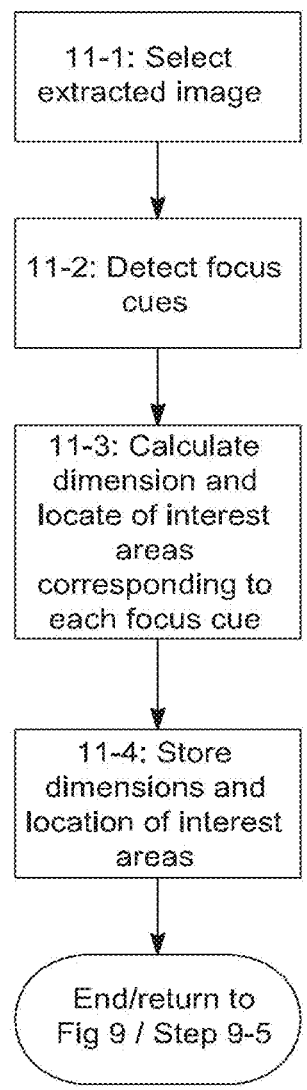

As outlined in the claims and elsewhere herein, the contextualization step shown at step 9-4 could be conducted upon the completion of each extraction step 9-3, or at a bare minimum at least once in respect of each camera view at a monitoring location. On the initialization of a contextualization of a camera view, the contextualization substeps are shown in FIG. 11. In a contextualization step, the first element of that workflow would be the selection of one or more extracted images of the particular camera view being contextualized—shown at step 11-1. These extracted images would have been recovered from extraction step related to an image transmission received from an endpoint device 11 at the monitoring location in question. The object detection function of the monitoring software component 17 would be applied to the at least one extracted image to detect the presence of any focus cues therein—see Step 11-2. The presence of automatically identified focused whose signifying interest regions in the image or images would be used to next calculate the dimensions and location of each interest region in the images in question which correspond to the focus cues located. Basically recognition of the presence of one or more focus cues in the image will be used to automatically identify the interest regions to be monitored visually by the system of the present invention—the calculation and location of the interest regions is shown at step 11-3.

Following the location and dimension calculation with respect to each interest region, the dimensions and location of the interest regions will be stored, shown at 11-4, and the camera view in question would at this point be a contextualized camera view in respect of which the necessary interest region information had been calculated for the purpose of subsequent monitoring thereof. Following the storage of the dimensions and location of the interest regions control of the method would return to the primary loop of FIG. 9.

Also shown in the flowchart of FIG. 9 is the monitoring loop—shown to begin at step 9-5. The monitoring loop effectively comprises examining each extracted image received in an image transmission from an endpoint device 11 to the server 15 to identify any potential failure conditions therein. The steps involved in the monitoring loop are shown in FIG. 12 as one example of this aspect of the method, which would be conducted upon the detection of the completion of an extraction step i.e. when the monitoring software component 17 detected the availability of one or more new extracted images from one or more camera views monitored by the system, each extracted image would be processed in accordance with the substeps of FIG. 12.

Figure 12:
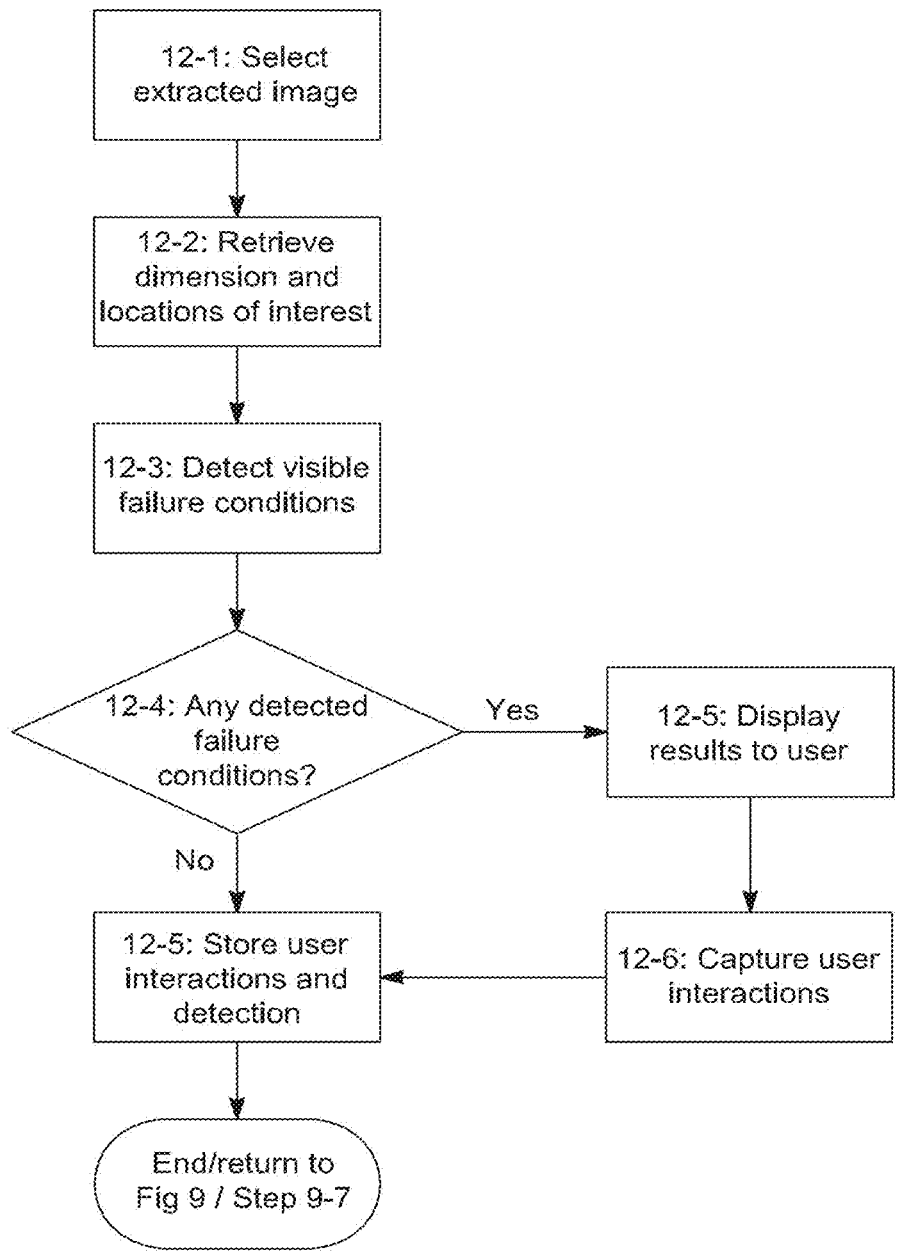

Referring to FIG. 12, the extracted image to be processed would be selected, shown at 12-1, and the dimensions and locations of interest regions in the extracted image, as it pertains to a contextualized camera view, would be retrieved from the memory of the server. This is shown at step 12-2. The interest regions with respect to the camera view in question could then be superimposed on the extracted image by the monitoring software component 17 and the object detection function would be applied to the extracted image to detect the presence of any visible failure conditions (shown at 12-3). If any failure detections were visibly detected by the monitoring software component 17—shown as a Boolean test at decision block 12-4—the results would be displayed to the user via a human interface device (12-5) and the user would be permitted to interact with the human interface device for the purpose of accepting, rejecting or modifying the identified failure conditions. The user interactions and detection results would be stored (12-7) and the control of the method would return to the primary workflow of FIG. 9.

Following the return to the workflow of FIG. 9 from the substeps of the monitoring loop where a new extracted image is determined to be available, step 9-7 shows the adaptation of the object detection function by the monitoring software component 17 based upon the detection results and any user interactions with the server. By modifying the mathematical function based upon user input and identification and detection results, the accuracy of the model can be continually enhanced.

The end of the monitoring loop is shown at step 9-8.

It will be understood that the image capture step, the extraction step, contextualization as well as the monitoring loop for the actual visual detection of failure conditions could be conducted in parallel or as all part of a single loop, rather than the specific workflow shown in FIG. 9 and any type of a conduct of methodology including these steps in any relevant order upon the initiation or completion of an image capture step 9-1 will all be understood to be within the scope of the present invention.

It is specifically contemplated that in certain embodiments of the method of the present invention a contextualization step would be conducted with respect to each new extracted image that became available with respect to particular camera view—in that case where each image was to be contextualized as well as process for the purpose of recognition of any visible failure conditions, the workflow of FIG. 9 would be altered to show the contextualization step inside the monitoring loop. It will be understood that many different types of approaches to the overarching method outlined in the claims and the remainder of this application could be constructed to allow for data processing and image processing in accordance with the present invention, without departing from the scope hereof, and any modified specific embodiment of the methodology and flowcharts that comes within the bounds of the claimed process and system are all contemplated to be encompassed herein.

Control Signal:

It is explicitly contemplated that the system of the present invention might also include a control signal functionality wherein the server 15 could upon the detection with a high level of certainty of a failure condition at a particular monitoring location, would have an interface by which a control signal could be dispatched to equipment operating at the monitoring location to shut down the equipment where a leak or other failure has been detected. The addition of a control interface to the server and/or the endpoint device to facilitate this added shutdown functionality will be understood to also be within the scope of the present invention.

Past or Future Detection:

It is explicitly contemplated that by identifying pre-existing anomalies in images such as contamination or spills or the like, an already occurred leak could be identified for example. In other embodiments, the system and method of the present invention could be used to predictably identify future failures based upon either image data received or else based upon a sensor data stream i.e. for example nonconforming power consumption, pressure and temperature readings of the like could indicate, freestanding or in conjunction with image results, the likelihood of a looming failure of a particular type of a component. Again both types of approaches are contemplated within the scope of the present invention.

It will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

Those skilled in the art will recognize that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. The terms "comprises" and "comprising" should be interpreted as referring to elements, components, or steps in a non-exclusive manner, indicating that the referenced elements, components, or steps may be present, or utilized, or combined with other elements, components, or steps not expressly referenced.

What is claimed is:

1. A method of remote visual inspection and failure detection at a plurality of monitoring locations each including at least one digital camera positioned with a camera view of the monitoring location, said method comprising:
   a. providing a server comprising:
      i. a processor and memory;
      ii. a server network interface via which the server can receive captured images from digital cameras in relation to monitoring locations, and otherwise communicate with external devices via the network;
      iii. at least one human interface device permitting graphic display and user interaction with users; and
      iv. a monitoring software component to facilitate the conduct of the method via the server by:
         1. receiving network transmissions of at least one camera view for each active monitoring location for use or storage on the server; and
         2. in respect of monitoring locations, conduct adaptive object-detection image detection of:
            a. focus cues indicating interest regions in image views of monitoring locations corresponding to high-probability failure areas for ongoing visual inspection; and
            b. visible failure attributes indicating the potential existence of failure conditions at a monitoring location; and
   b. in respect of each active monitoring location:
      i. receiving via the network interface at the server data related to images of at least one camera view of the operating area of the monitoring location
      ii. in a contextualization step, using the server and the monitoring software component to contextualize the monitoring location in respect of each camera view by:
         1. selecting a received captured image of the camera view;
         2. applying the object-detection function to detect the presence of any focus cues within the captured image;

3. using each detected focus cue to calculate a desired dimension and location of a corresponding interest region in the captured image; and
storing the dimensions and location of each interest region in respect of the corresponding camera view, now being a contextualized camera view, in the memory of the server;
iii. in a monitoring loop, using the server and monitoring software component:
iv. on receipt of periodically captured image data at the server from a digital camera associated therewith:
1. executing an extraction step wherein the extracted images corresponding to contextualized camera views at the monitoring location of camera are extracted therefrom;
2. for each extracted image:
a. applying the stored dimensions and location of each interest region in the corresponding contextualized camera view stored in the memory of the server to the extracted image, identifying defined interest regions in the extracted image;
b. applying the object-detection function to each defined interest region of the extracted image to detect the presence of any visible failure conditions therein; and
c. on detection of any visible failure attributes within a defined interest region which might signify a failure condition, executing a notification step by:
i. displaying to a user via a human interface device at least the portion of the extracted image corresponding to the defined interest region containing the detected failure attributes;
ii. permitting the user to validate, reject or modify the detected failure attributes; and
iii. storing any user validation, rejection or modification indications of the user with respect to the detected failure attributes
wherein the monitoring software component will adapt the adaptive object-detection function based upon the stored user interactions from notifications of failure condition detections to enhance its level of accuracy and certainty in future failure attribute and condition detections.

2. The method of claim 1, wherein the notification step further comprises displaying additional information to the user selected from the group of:
a. visual identification of the failure attributes detected indicated on the extracted image which contribute to the determination of the existence of the failure condition; or
b. a calculated confidence score in respect of the detected failure condition.

3. The method of claim 2, wherein the camera view of more than one camera encompasses the same area of the monitoring location, whereby the level of certainty in failure detection within the monitoring location is maximized by processing of multiple camera view images.

4. The method of claim 1, wherein the focus cues which will be recognized by the object-detection function are selected from the group of:
a. detected interfaces between equipment and the environment;
b. detected interfaces between components of equipment;
c. elements of the surrounding environment;
d. detected equipment which has a purpose related to leak containment, mitigation, fluid presence or tank levels; or
e. physical framing elements positioned in the view of the corresponding cameras.

5. The method of claim 1, wherein the contextualization step in respect of a particular monitoring location and camera view further comprises, following the dimensioning and location of the interest regions:
a. using a human interface device, displaying the extracted image to a user via a human interface device along with an overlay of the position and dimension of each interest region, and permitting the user to validate, reject or modify the dimensions and location of the interest regions; and
b. adapting the object-detection function based upon the user interactions validating, rejecting or modifying the detected focus cues and the dimensions and locations of the interest regions to enhance its level of accuracy and certainty in future contextualization and interest region rendering.

6. The method of claim 1, wherein the detected failure attributes which are used to determine the existence of a failure condition within an interest region include:
a. color contrast in the image;
b. colors within the image;
c. textures within the image;
d. relative position of detected edges in the image;
e. relative orientation and angle of edges or contrasting regions in the image; or
f. identification of data patterns correlating to failure conditions.

7. The method of claim 1, wherein the at least one digital camera is selected from the group of:
a. regular image cameras;
b. cameras capable of receiving any spectrum of light and generating an image output;
c. infrared cameras; and
d. cameras capable of gas detection.

8. The method of claim 1, wherein the image captured from at least one digital camera is a still image.

9. The method of claim 1, wherein the image captured from at least one digital camera is a video image.

10. The method of claim 1, wherein each said human interface device comprises a human interface of a remote client device operatively connected to the server by the network.

11. A system for remote visual facilities inspection and failure detection at a plurality of monitoring locations, said system comprising:
a. a server comprising:
i. a processor and memory;
ii. a server network interface via which the server can receive captured images from digital cameras in relation to monitoring locations, and otherwise communicate with external devices via the network;
iii. at least one human interface device permitting graphic display and user interaction with users; and
iv. a monitoring software component to facilitate the conduct of the method via the server by:
1. receiving network transmissions of at least one camera view for each active monitoring location for use or storage on the server; and 2. in respect of monitoring locations, conduct adaptive object-detection image detection of:
　　　　a. focus cues indicating interest regions in image views of monitoring locations corresponding to high-probability failure areas for ongoing visual inspection; and
　　　　b. visible failure attributes indicating the potential existence of failure conditions at a monitoring location;
wherein said system will facilitate the methods by:
b. in respect of each active monitoring location:
　i. receiving via the network interface at the server data related to images of at least one camera view of the operating area of the monitoring location
　ii. in a contextualization step, using the server and the monitoring software component to contextualize the monitoring location in respect of each camera view by:
　　1. selecting a received captured image of the camera view;
　　2. applying the object-detection function to detect the presence of any focus cues within the captured image;
　　3. using each detected focus cue to calculate a desired dimension and location of a corresponding interest region in the captured image; and
　　　storing the dimensions and location of each interest region in respect of the corresponding camera view, now being a contextualized camera view, in the memory of the server;
　iii. in a monitoring loop, using the server and monitoring software component:
　iv. on receipt of periodically captured image data at the server from a digital camera associated therewith:
　　1. executing an extraction step wherein the extracted images corresponding to contextualized camera views at the monitoring location of camera are extracted therefrom;
　　2. for each extracted image:
　　　a. applying the stored dimensions and location of each interest region in the corresponding contextualized camera view stored in the memory of the server to the extracted image, identifying defined interest regions in the extracted image;
　　　b. applying the object-detection function to each defined interest region of the extracted image to detect the presence of any visible failure conditions therein; and
　　　c. on detection of any visible failure attributes within a defined interest region which might signify a failure condition, executing a notification step by:
　　　　i. displaying to a user via a human interface device at least the portion of the extracted image corresponding to the defined interest region containing the detected failure attributes;
　　　　ii. permitting the user to validate, reject or modify the detected failure attributes; and
　　　　iii. storing any user validation, rejection or modification indications of the user with respect to the detected failure attributes
　wherein the monitoring software component will adapt the adaptive object-detection function based upon the stored user interactions from notifications of failure condition detections to enhance its level of accuracy and certainty in future failure attribute and condition detections.

12. A server for use in a method of remote visual inspection and failure detection at a plurality of monitoring locations, said server comprising:
　a. a processor and memory;
　b. a server network interface via which the server can receive captured images from digital cameras in relation to monitoring locations, and otherwise communicate with external devices via the network;
　c. at least one human interface device permitting graphic display and user interaction with users; and
　d. a monitoring software component to facilitate the conduct of the method via the server by:
　　i. receiving network transmissions of at least one camera view for each active monitoring location for use or storage on the server; and
　　ii. in respect of monitoring locations, conduct adaptive object-detection image detection of:
　　　1. focus cues indicating interest regions in image views of monitoring locations corresponding to high-probability failure areas for ongoing visual inspection; and
　　　2. visible failure attributes indicating the potential existence of failure conditions at a monitoring location;
wherein said server will administer a method comprising:
a. in respect of each active monitoring location:
　iii. receiving via the network interface at the server data related to images of at least one camera view of the operating area of the monitoring location
　iv. in a contextualization step, using the server and the monitoring software component to contextualize the monitoring location in respect of each camera view by:
　　1. selecting a received captured image of the camera view;
　　2. applying the object-detection function to detect the presence of any focus cues within the captured image;
　　3. using each detected focus cue to calculate a desired dimension and location of a corresponding interest region in the captured image; and
　　　storing the dimensions and location of each interest region in respect of the corresponding camera view, now being a contextualized camera view, in the memory of the server;
　v. in a monitoring loop, using the server and monitoring software component:
　vi. on receipt of periodically captured image data at the server from a digital camera associated therewith:
　　1. executing an extraction step wherein the extracted images corresponding to contextualized camera views at the monitoring location of camera are extracted therefrom;
　　2. for each extracted image:
　　　a. applying the stored dimensions and location of each interest region in the corresponding contextualized camera view stored in the memory of the server to the extracted image, identifying defined interest regions in the extracted image;
　　　b. applying the object-detection function to each defined interest region of the extracted image to detect the presence of any visible failure conditions therein; and
　　　c. on detection of any visible failure attributes within a defined interest region which might signify a failure condition, executing a notification step by:

i. displaying to a user via a human interface device at least the portion of the extracted image corresponding to the defined interest region containing the detected failure attributes;
ii. permitting the user to validate, reject or modify the detected failure attributes; and
iii. storing any user validation, rejection or modification indications of the user with respect to the detected failure attributes wherein the monitoring software component will adapt the adaptive object-detection function based upon the stored user interactions from notifications of failure condition detections to enhance its level of accuracy and certainty in future failure attribute and condition detections.

* * * * *